(12) United States Patent
Yamamoto et al.

(10) Patent No.: US 6,679,526 B2
(45) Date of Patent: Jan. 20, 2004

(54) THREADED JOINT FOR AN OIL WELL PIPE

(75) Inventors: Hideo Yamamoto, Hyogo (JP); Kazuyuki Nakasuji, Hyogo (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 29 days.

(21) Appl. No.: 10/082,212

(22) Filed: Feb. 26, 2002

(65) Prior Publication Data

US 2003/0066641 A1 Apr. 10, 2003

Related U.S. Application Data

(63) Continuation of application No. PCT/JP00/05661, filed on Aug. 24, 2000.

(30) Foreign Application Priority Data

| Aug. 27, 1999 | (JP) | 11-241889 |
| Aug. 27, 1999 | (JP) | 11-241890 |
| Aug. 27, 1999 | (JP) | 11-241892 |
| Sep. 30, 1999 | (JP) | 11-279695 |

(51) Int. Cl.$^7$ .......................... F16L 15/04; C23C 26/00
(52) U.S. Cl. .......................... 285/55; 285/94; 285/333; 285/355
(58) Field of Search .................. 285/55, 94, 333, 285/334, 355, 390

(56) References Cited

U.S. PATENT DOCUMENTS

| 4,813,714 A | * | 3/1989 | Fairey et al. ............... 285/94 |
| 5,253,902 A | * | 10/1993 | Petelot et al. ............... 285/94 |
| 5,431,831 A | * | 7/1995 | Vincent .................... 508/116 |
| 2003/0094810 A1 | * | 5/2003 | Goto et al. ................. 285/94 |

FOREIGN PATENT DOCUMENTS

| JP | 52-093864 | 8/1977 |
| JP | 61-079797 | 4/1986 |
| JP | 61-117286 | 6/1986 |
| JP | 03-061784 | 3/1991 |
| JP | 3-78517 | 12/1991 |
| JP | 05-187581 | 7/1993 |
| JP | 08-103724 | 4/1996 |
| JP | 08-105582 | 4/1996 |
| JP | 08-233163 | 9/1996 |
| JP | 08-233164 | 9/1996 |
| JP | 10-280176 | 10/1998 |

\* cited by examiner

*Primary Examiner*—Eric K. Nicholson
(74) *Attorney, Agent, or Firm*—Clark & Brody

(57) ABSTRACT

A threaded joint for an oil well pipe is provided which prevents the occurrence of galling at the time of repeated tightening and loosening and which provides a high degree of air tightness and has excellent galling resistance and air tightness without using a liquid lubricant such as a compound grease.

1. A lubricating film of an inorganic polymeric compound which has an M (metal element)—O (oxygen) backbone and has a solid lubricant dispersed therein is formed on a threaded portion or an unthreaded metal contact portion.

2. A phosphate film and the lubricating film of the inorganic polymeric compound is formed on the threaded portion or the unthreaded metal contact portion.

3. A Cu plating layer and the lubricating film of the inorganic polymeric compound or a lubricating film of a resin in which a solid lubricant is dispersed is formed on the threaded portion or the unthreaded metal contact portion.

4. A lubricating film of the inorganic polymeric compound or a lubricating film of the polymer and a rust preventing film containing an alkali metal salt of a carboxylic acid or an alkali earth metal salt of a carboxylic acid are formed on the threaded portion or the unthreaded metal contact portion.

17 Claims, 6 Drawing Sheets

THREADED JOINT FOR AN OIL WELL PIPE

This application is a continuation of International Application No. PCT/JP00/05661, filed Aug. 24, 2000.

TECHNICAL FIELD

This invention relates to a threaded joint for an oil well type having excellent galling resistance. More particularly, it relates to a threaded joint for an oil well pipe used in the excavation of crude oil and which can undergo repeated tightening and loosening without using a liquid lubricant and without galling, which maintains air tightness, and which can be used repeatedly.

BACKGROUND ART

Oil well pipe such as tubing and casing which is used in the excavation of oil wells is typically connected by threaded joints. The depth of oil wells is normally 2,000 to 3,000 meters, but recently the depth has reached 8,000 to 10,000 meters in deep wells such as those in offshore oil fields. A threaded joint for connecting such oil well pipes is used under tensile forces in the axial direction caused by the weight of the oil well pipe and the threaded joint itself, a compound pressure due to internal and external surface pressure, and heat, so it is required that it be able to maintain air tightness without damage even in such an environment. Furthermore, during the process of lowering tubing or casing, there are cases in which a joint which is once tightened is loosened and then retightened. API (American Petroleum Institute) requires that there be no occurrence of seizing referred to as galling and that air tightness be maintained even if tightening (make-up) and loosening (break-out) are carried out ten times for a tubing joint and three times for a casing joint.

A threaded joint normally has a structure in which an external thread is formed on the end of an oil well pipe, an internal thread is formed on the inner surface of a threaded coupling, an unthreaded metal contact portion formed on the end of the external thread is mated with an unthreaded metal contact portion formed on the base of the internal thread, and by performing tightening, the unthreaded metal contact portions are made to contact each other and a metal seal portion is formed. Galling resistance and air tightness are increased by performing surface treatment of the threads and the unthreaded metal contact portions and by applying a compound grease at the time of tightening.

However, particularly in the unthreaded metal contact portions, a high surface pressure acts which exceeds the yield point of the material of the threaded joint, so that galling easily takes place. Thus, various threaded joints have been proposed for improving galling resistance in such portions.

For example, Japanese Published Unexamined Patent Application Sho 61-79797 discloses a threaded joint in which the threaded portions are plated with Zn, Sn, or the like, and the unthreaded metal contact portions are plated with gold, platinum, or the like.

Japanese Published Examined Patent Application Hei 3-78517 discloses a pipe joint on which is formed a film of a synthetic resin containing 20–90% of molybdenum disulfide having a particle diameter of at most 10 micrometers dispersed therein.

Japanese Published Unexamined Patent Application Hei 8-103724 discloses a surface treatment method for a steel pipe joint in which a resin film containing molybdenum disulfide is formed atop a manganese phosphate chemical formation coating.

Japanese Published Unexamined Patent Application Hei 8-105582 discloses a surface treatment method for a pipe joint in which a nitriding treatment layer is made a first layer, an iron plated layer or an iron alloy plated layer is made a second layer, and atop this is formed a third layer comprising a resin film containing molybdenum disulfide.

However, the threaded joints disclosed in the above-described publications are each premised on the use of a compound grease. This grease contains powders of heavy metals such as zinc, lead and copper, and there is the concern of the occurrence of environmental pollution when a situation develops such as the grease which is applied at the time of joining the threads being washed off or the grease overflowing to the outer surface at the time of tightening. In addition, the process of applying a compound grease worsens the working environment and also decreases the operating efficiency. Accordingly, there is a desire for the development of a threaded joint which does not use such a compound grease.

A threaded joint in which a solid lubricant film is formed on its surface has been proposed as a threaded joint which does not use a compound grease.

For example, Japanese Published Unexamined Patent Application Hei 8-233163, Japanese Published Unexamined Patent Application Hei 8-233164, and Japanese Published Unexamined Patent Application Hei 9-72467 disclose threaded joints having formed thereon a resin film in which molybdenum disulfide is dispersed in a resin.

However, a threaded joint having a resin film formed thereon has the problem that compared to when a compound grease is used, the coefficient of friction of the contacting surfaces is high at the time of tightening the threaded joint, and a large tightening force becomes necessary. In the assembly of an oil well pipe line, it is important to reduce the tightening force of the threaded joint in order to improve workability, and in order to accomplish this, a threaded joint having a low coefficient of friction at contacting surfaces and excellent lubricity is desired as a threaded joint not using a compound grease.

In recent years, there has been a demand for a heat resistant threaded joint for use in high temperature oil wells in which the environment of use has been a high temperature of 250–300° C., and for steam injection oil wells in which high temperature steam (350° C.) which may even reach the critical temperature is injected in order to increase the crude oil recovery efficiency. Accordingly, a threaded joint is desired to have the properties that after a heat resistance test is performed on a tightened joint at a temperature exceeding 350° C., air tightness is maintained even when loosening and retightening is carried out.

However, with conventional technology disclosed in publications like those described above, it is difficult to guarantee such performance.

Namely, when a threaded joint is tightened, when a compound grease like that specified in API Standard BUL5A2 is employed, the grease component vaporizes due to the high temperature, and lubricity decreases, so there is the problem that a prescribed air tightness cannot be obtained at the time of retightening after loosening. Accordingly, the technology disclosed in Japanese Published Unexamined Patent Application Hei 5-117870, Japanese Published Unexamined Patent Application Hei 6-10154, Japanese Published Unexamined Patent Application Hei 5-149485, Japanese Published Unexamined Patent Application Hei 2-085593, and the like, which is premised on the application of a compound grease, has problems with respect to maintaining air tightness at high temperatures.

In the technology which is disclosed in Japanese Published Unexamined Patent Application Hei 8-233164 and Japanese Published Unexamined Patent Application Hei 9-72467, which is characterized in that it does not use compound grease, the resin deteriorates when it is exposed for long periods to a high temperature which may reach as high as 400° C., so it fails to function as a binder holding a solid lubricant such as molybdenum disulfide, and there are problems that the lubricity decreases, improper tightening and galling occur, and air tightness worsens.

In this manner, at present, a threaded joint having excellent galling resistance which can be repeatedly used under high temperature conditions reaching as high as 400° C. has not been obtained.

Furthermore, a threaded joint which is disclosed in the above-described publications and which does not use a compound grease has the problem that the tightening torque easily varies and tightening is unstable compared to a threaded joint using a compound grease. In addition, with threaded joints of the above-described publications which do not use a compound grease, the effect of preventing rusting of the joint in the period between shipment from a factory and on-site use is poor compared to when a compound grease is used, and there were the problems of formation of rust and accompanying swelling of a resin film, or that peeling took place and that tightening became all the more unstable at the time of tightening of the joint, galling took place, and air tightness decreased.

FIG. 1 is a schematic view showing the typical assembly of an oil well pipe and a threaded coupling at the time of shipment of the oil well pipe. Symbol A shows an oil well pipe, B shows a threaded coupling, 1 shows a box, 2 shows a pin, and 3 shows a threaded portion.

As shown in FIG. 1, an oil well pipe A is normally shipped in a state in which a box 1 having a threaded portion 3 formed on the inner surface of a threaded coupling B is threaded onto one pin 2 having a threaded portion 3 formed on the outer surface of both of its ends.

However, the exposed pin and box can easily rust. After shipment, in cases in which a compound grease is applied with the object of rust prevention, there is little formation of rust, but in cases in which only a resin film is used without a compound grease, the rust preventing properties of the film are poor, so rust easily forms.

Rust has poor lubricity, and surface irregularities can form on the pin and the box due to the formation of rust, so it can be the cause of galling at the time of tightening.

DISCLOSURE OF THE INVENTION

An object of this invention is to provide a threaded joint for an oil well pipe which does not use a liquid lubricant such as a compound grease and which can suppress the occurrence of galling when tightening and loosening are repeatedly performed and which can provide a high degree of air tightness and which has excellent galling resistance and air tightness.

Specifically, an object of this invention is to provide a threaded joint for an oil well pipe which can suppress the occurrence of galling when tightening and loosening are repeatedly performed without using a liquid lubricant such as a compound grease, which has a low coefficient of friction at the time of tightening, which can provide a high degree of air tightness with a low tightening torque, and which has excellent galling resistance and air tightness.

In addition, specifically, an object of the present invention is to provide a threaded joint for an oil well pipe which suppresses the occurrence of galling when repeated tightening and loosening are performed without the use of a liquid lubricant such as a compound grease and which provides a high degree of air tightness and has excellent galling resistance and air tightness for the excavation of crude oil in a high temperature environment such as a deep, high temperature oil well or a steam injection oil well.

Furthermore, a specific object of the present invention is to provide a threaded joint for an oil well pipe which suppresses the formation of rust and which can eliminate instability of tightening torque and which suppresses the occurrence of galling during repeated tightening and loosening without the use of a liquid lubricant such as a compound grease and which has excellent galling resistance and air tightness.

In order to achieve the above objects and to provide a threaded joint having a solid lubricating film formed on its surface, the present inventors performed basic investigations concerning the heat resistance and lubricity of the solid lubricant and the binder forming the solid lubricating film, and they obtained the following knowledge. Below, a solid lubricating film will be referred to simply as a lubricating film.

(1) A solid lubricant such as molybdenum disulfide or graphite does not degenerate or break down due to heat even at a temperature on the order of 400° C., and it exhibits good lubricity which is the same as that at room temperature.

(2) If a resin is used as a binder for a solid lubricant, degeneration, decomposition, or carbonization take place in a high temperature environment after a long period exceeding 24 hours, it loses its function as a binder of covering the surface of the joint with the solid lubricant, and lubricity decreases. However, if a resin is used together with a Cu plating layer, a good lubricity is maintained even in a high temperature environment.

(3) Inorganic compounds such as oxides, carbides, or nitrides of silicon, titanium, aluminum, or the like are thermally stable, but they have utterly no ability to function as a binder for covering a solid lubricant. Accordingly, they cannot form a film, so the lubricity is low even if they are mixed in a solid lubricant.

(4) A metal alkoxide ($M(OR)_4$, wherein M is a metal element such as silicon or titanium, 0 is oxygen, and R is an alkyl group) has an alkyl group, so it exhibits properties like an organic substance, and it can function as a binder. This material is unstable in the atmosphere, so it absorbs moisture and co-hydrolysis takes place, and the breakdown products bond to each other and transform into a thermally stable inorganic polymeric compound having a network structure with a backbone expressed by M (metal element)—O (oxygen). Formula (1) shows the basic molecular structure of an inorganic polymeric compound having an M—O backbone.

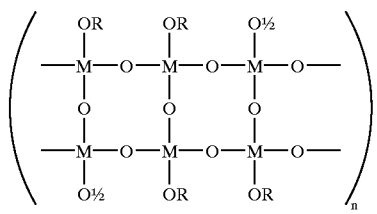

$$(1)$$

(5) An inorganic polymeric compound having an M—O backbone is hard and has excellent wear resistance.

(6) Accordingly, by mixing a solid lubricant such as molybdenum disulfide or graphite with the above-described metal alkoxide as a binder, applying the resulting mixture to form a coating layer and performing moisturizing treatment, a lubricating film can be formed. The lubricating film comprises an inorganic polymeric compound having an M—O backbone and containing a solid lubricant such as molybdenum disulfide or graphite.

The present inventors investigated suitable conditions for forming a lubricating film of an inorganic polymeric compound having the above-described M—O backbone on a threaded joint and obtained the following knowledge.

(7) Galling is suppressed by forming a lubricating film of an inorganic polymeric compound having an M—O backbone on the unthreaded metal contact portion of at least one of either a pin or a box.

(8) The mass ratio (B/A) of the content B of the solid lubricant to the content A of the inorganic polymeric compound having an M—O backbone in the lubricating film is preferably in the range of 0.3–9.0.

(9) Galling resistance can be increased by adjusting the surface roughness Rmax in the region on which the lubricating film is formed to be 3–15 micrometers, and by making the thickness of the lubricating film 5–30 micrometers.

(10) Co-hydrolysis is promoted by performing moisturizing and heating after applying a mixture of a metal alkoxide and a solid lubricant, so the length of time for forming a lubricating film is shortened, the vaporization and discharge of co-hydrolysis products are promoted, and the adhesion of the film becomes strong, so galling resistance is increased.

The present inventors also investigated suitable conditions for forming a phosphate film and a lubricating film of an inorganic polymeric compound having an M—O backbone on a threaded joint made of carbon steel or a low alloy steel having a Cr content of less than 10 mass percent, and they made the following findings.

(11) Galling can be suppressed by forming a phosphate film on the unthreaded metal contact portion of at least one of either the pin and the box and by further forming a lubricating film of an inorganic polymeric compound having an M—O backbone atop it.

(12) The mass ratio (B/A) of the content B of the solid lubricant to the content A of the inorganic polymeric compound having an M—O backbone in the lubricating film is preferably in the range of 0.3–9.0.

(13) Galling resistance is increased by adjusting the surface roughness Rmax of the unthreaded metal contact portion on which the phosphate film is formed to be 3–15 micrometers, and by making the thickness of the lubricating film 5–30 micrometers.

Furthermore, the present inventors investigated suitable conditions for forming a layer of Cu plating and a lubricating film of a resin or an inorganic polymeric compound having an M—O backbone on a threaded joint, and they made the following findings.

(14) Galling can be suppressed by forming a layer of Cu plating on the unthreaded metal contact portion of at least one of either a pin or a box and by further forming a lubricating film of a resin or an inorganic polymeric compound having an M—O backbone atop it or on the unthreaded metal contact portion of the other member.

(15) The mass ratio (B/A) of the content B of the solid lubricant to the content A of the resin or the inorganic polymeric compound having an M—O backbone in the lubricating film is preferably in the range of 0.3–9.0.

(16) Galling resistance is improved by adjusting the surface roughness Rmax of the layer of Cu plating to be 3–15 micrometers and by making the thickness of the lubricating film 5–30 micrometers.

(17) The above-described surface roughness can be achieved by so-called blasting treatment in which shots or other hard pieces are blown against the region on which the layer of Cu plating is to be formed (the substrate) or against the layer of Cu plating.

The present inventors also conceived of forming a rust-preventing film in addition to a lubricating film, they performed basic investigations concerning rust-preventing films, and they made the following findings.

(18) A film containing a salt of a carboxylic acid and an alkali metal or an alkali earth metal is in the form of a semi-solid or a solid at room temperature and is effective for rust prevention over long periods. Such a salt will be referred to as a metal salt of a carboxylic acid. Furthermore, when an alkali metal is referred to, it will include an alkali earth metal.

(19) The above-described film has a high saponification number, and the higher its total base number, the more effective it is for long term rust prevention.

(20) A film which includes the above-described salt and further includes a lubricant such as graphite, molybdenum disulfide, or an organic Mo compound decreases the coefficient of friction of the contact surfaces at the time of tightening and can stabilize the tightening torque of a joint at a low value.

Based on the results of the above-described basic investigations, further detailed investigations were carried out with respect to the rust-preventing properties and lubricity of a threaded joint having a lubricating film and a rust preventing film formed thereon, with rust prevention being investigated by a salt spray test specified by JIS-Z2371 and with lubricity being investigated by a ring/block contact-type friction test, and the following knowledge was obtained.

FIG. 2 shows graphs indicating the relationship between the area in which rusting occurred in a salt spray test and the saponification number, the total base number, the content of alkali metal, and the thickness of a rust preventing film. In the figure, (a) is a graph of the area of rust formation and saponification number, (b) is a graph of the area of rust formation and the total base number, (c) is a graph of the area of rust formation and the alkali metal content, and (d) is a graph of the area of rust formation and the thickness of a rust preventing film.

FIG. 3 shows graphs of the relationship between the coefficient of friction in a friction test and the saponification number, the total base number, the alkali metal content, and the thickness of a rust preventing film. In the figure, (a) is a graph showing the coefficient of friction and the saponification number, (b) is a graph showing the coefficient of friction and the total base number, (c) is a graph showing the coefficient of friction and the alkali metal content, and (d) is a graph showing the coefficient of friction and the thickness of a rust preventing film. In FIGS. 2 and 3, the rust preventing film is a solid film containing a metal salt of a carboxylic acid. The standard film forming conditions were an alkali metal content of 10 mass percent, a saponification number of 50 mgKO H/g, an total base number of 50 mgKO H/g, and a film thickness of 10 micrometers.

(21) As shown in FIGS. 2(a)–(c) and FIGS. 3(a)–(c), when the saponification number is 20–150 mgKO H/g, the total base number is 15–100 mgKO H/g, and the alkali metal content is 2–20 mass percent, then the rust preventing film has excellent rust preventing properties and it has good frictional properties with a reduced coefficient of friction.

(22) When forming a rust preventing film containing a metal salt of a carboxylic acid, if the metal salt is diluted with an organic solvent and a rust preventing oil with a viscosity at 40° C. of 2–30 cSt is used after dilution, the adhesion of the rust preventing oil is increased.

(23) When forming a rust preventing film atop a lubricating film, as shown in FIG. 2(d) and FIG. 3(d), rust preventing properties and lubricity can both be maintained at good levels by making the thickness of the rust-preventing film 1 micrometer–50 micrometers.

(24) When a lubricating film is formed on one of a box and a pin and a rust preventing film is formed on the other, the above-described properties can be maintained at good levels by making the thickness of the rust preventing film 5 micrometers-50 micrometers.

(25) If a lubricant in the form of graphite or molybdenum disulfide or an organic Mo compound is included in the rust preventing film, the coefficient of friction is stabilized at an even lower level, and the tightening torque can be stabilized at an even lower level. The content thereof is 5–30 mass percent.

The present inventors performed further investigations based on this knowledge, and they completed the present invention.

Here, the present invention is a threaded joint for an oil well pipe comprising a pin and a box each having a threaded portion and an unthreaded metal contact portion, characterized by having a lubricating film formed on the unthreaded metal contact portion of at least one of either the pin or the box, the lubricating film comprising a solid lubricant dispersed and mixed in an inorganic polymeric compound, the inorganic polymeric compound having an M—O backbone. This will be referred to as the first invention.

From another standpoint, the present invention is a threaded joint for an oil well pipe comprising a pin and a box each having a threaded portion and an unthreaded metal contact portion, characterized by having a phosphate film formed on the unthreaded metal contact portion of at least one of either the pin or the box, and having a lubricating film formed atop the phosphate film, the lubricating film comprising a solid lubricant dispersed and mixed in an inorganic polymeric compound, the inorganic polymeric compound having an M—O backbone. This will be referred to as the second invention.

From another standpoint, the present invention is a threaded joint for an oil well pipe comprising a pin and a box each having a threaded portion and an unthreaded metal contact portion, characterized by having a layer of Cu plating formed on the unthreaded metal contact portion of at least one of either the pin or the box, and having a lubricating film formed atop the layer of Cu plating, the lubricating film comprising a solid lubricant dispersed and mixed in a polymeric compound, the polymeric compound comprising an inorganic polymeric compound, the inorganic polymeric compound having an M—O backbone. The polymeric compound can be a resin. This will be referred to as the third invention.

From another standpoint, the present invention is a threaded joint for an oil well pipe comprising a pin and a box each having a threaded portion and an unthreaded metal contact portion, characterized by having a layer of Cu plating formed on the unthreaded metal contact portion of one of either the pin or the box, and having a lubricating film formed on the other unthreaded metal contact portion, the lubricating film comprising a solid lubricant dispersed and mixed in a polymeric compound, the polymeric compound comprising an inorganic polymeric compound, the inorganic polymeric compound having an M—O backbone. The polymeric compound can be a resin. This will be referred to as the fourth invention.

From another standpoint, the present invention is a threaded joint for an oil well pipe comprising a pin and a box each having a threaded portion and an unthreaded metal contact portion, characterized by having a lubricating film formed on one of either the pin or the box, and having a rust preventing film formed on the other or atop the lubricating film, the rust preventing film comprising a rust preventing oil composition containing an alkali metal salt of a carboxylic acid and/or an alkali earth metal salt of a carboxylic acid, the lubricating film comprising a solid lubricant dispersed and mixed in a polymeric compound, the polymeric compound comprising an inorganic polymeric compound, the inorganic polymeric compound having an M—O backbone. The polymeric compound can be a resin. This will be referred to as the fifth invention.

In the threaded joint for an oil well pipe according to the fifth invention, the thickness of the rust preventing film formed on the other is preferably 5–50 μm.

From another standpoint, the present invention is a threaded joint for an oil well pipe comprising a pin and a box each having a threaded portion and an unthreaded metal contact portion, characterized by having a lubricating film formed on both the box and the pin, and having a rust preventing film atop the lubricating film of at least one of either the box or the pin, the rust preventing film comprising a rust preventing oil composition containing an alkali metal salt of a carboxylic acid and/or an alkali earth metal salt of a carboxylic acid, the lubricating film comprising a solid lubricant dispersed and mixed in a polymeric compound, the polymeric compound comprising an inorganic polymeric compound, the inorganic polymeric compound having an M—O backbone. The polymeric compound can be a resin. This will be referred to as the sixth invention.

In the threaded joint for an oil well pipe according to the sixth invention, the thickness of the rust preventing film formed atop the lubricating film is preferably 1–50 μm.

In the threaded joint for an oil well pipe according to the fifth and sixth inventions, the saponification number of the rust preventing oil composition is preferably 20–150 mgKO H/g, its total base number is preferably 15–100 mgKO H/g, and the total content of alkali metals and alkali earth metals in the rust preventing oil composition is preferably 2–20 mass %.

In the threaded joint for an oil well pipe according to the first through sixth inventions, the inorganic polymeric compound preferably has a Ti-O backbone.

BEST MODE FOR CARRYING OUT THE INVENTION

The structure of a threaded joint for an oil well pipe according to the present invention will be described. A threaded joint for an oil well pipe will also be referred to as a threaded joint.

Figure 4:
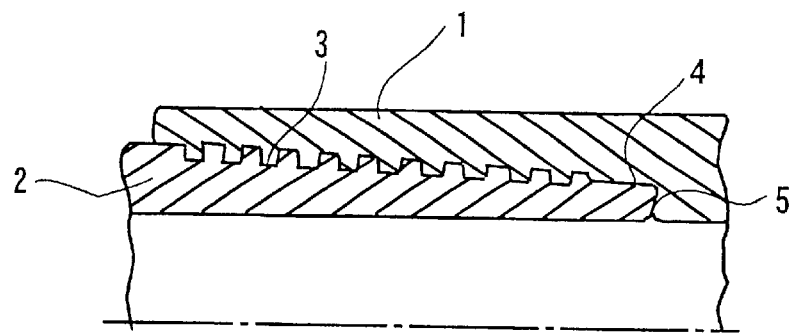
FIG. 4 is a schematic view showing the typical structure of a threaded joint according to the present invention.

FIG. 4 is a schematic view showing the typical structure of a threaded joint according to the present invention. Symbol 1 indicates a box, 2 indicates a pin, 3 indicates a threaded portion, 4 indicates an unthreaded metal contact portion, and 5 indicates a shoulder portion. An unthreaded metal contact portion will also be referred to as a metal contact portion.

As shown in FIG. 4, a threaded joint for an oil well pipe according to the present invention comprises a box 1 made from a threaded portion 3 and an unthreaded metal contact portion 4 formed on the inner surface of a threaded coupling, and a pin 2 formed from a threaded portion 3 and an unthreaded metal contact portion 4 formed on the outer surface of the end of an oil well pipe.

Next, an inorganic polymeric compound having an M—O backbone according to the first through sixth inventions will be described.

A material having the function of a binder for a solid lubricant such as molybdenum disulfide or graphite and having heat resistance and a suitable hardness and wear resistance is used as the inorganic polymeric compound having an M—O backbone. Some examples of such a material are inorganic polymeric compounds having the molecular structure shown by the above formula (1) and having a backbone expressed by Ti—O, Si—O, Zr—O, Mn—O, Ce—O, Ba—O, or the like having an alkyl group such as methyl, ethyl, isopropyl, propyl, isobutyl, or butyl. It is preferably an inorganic polymeric compound having a Ti—O backbone. More preferably, it is an inorganic polymeric compound having a Ti—O backbone in which the alkyl group is methyl, ethyl, or propyl.

Next, a resin according to the third through sixth inventions will be described.

As the resin, a material functioning as a binder for a solid lubricant such as molybdenum disulfide or graphite and having heat resistance and a suitable hardness and wear resistance is used. Examples of such a material are thermosetting resins such as epoxy resins, polyimide resins, polyamide-imide resins, polyethersulfone, and polyether ether ketone, and phenolic resins, polyethylene resins, and silicone resins. Preferably it is a thermosetting resin. Low boiling point liquids such as toluene and isopropyl alcohol can be used alone or in combination as a dispersant when forming the resin film.

Next, a solid lubricant according to the first through sixth inventions will be described.

The solid lubricant is dispersed in the resin or the inorganic polymeric compound having an M—O backbone, it is strongly adhered thereby to the surface of the threaded joint, and it is thinly spread by the tightening pressure at the time of tightening operation, so it has the effect of increasing the lubricity of the lubricating film and of increasing galling resistance.

Some examples of a solid lubricant having such an action are carbonates, silicates, oxides, carbides, nitrides, sulfides, fluorides, graphite, molybdenum disulfide, tungsten disulfide, calcium stearate, cluster diamonds, fullerene $C_{60}$, and organic molybdenum compounds. These may be used alone, or a mixture of two or more may be used. Preferably it is tungsten disulfide, graphite, molybdenum disulfide, or an organic molybdenum compound. Molybdenum disulfide has good lubricity particularly under a high surface pressure, so molybdenum disulfide is preferably used by itself with a threaded joint made of a high strength material.

Some examples of a carbonate are carbonates of alkali metals or alkali earth metals such as $Na_2CO_3$, $CaCO_3$, and $MgCO_3$. An example of a silicate is $M_xO_ySiO_2$ (wherein M is an alkali metal or an alkali earth metal). Some examples of an oxide are $Al_2O_3$, $TiO_2$, CaO, ZnO, $ZrO_2$, $SiO_2$, $Fe_2O_3$, $Fe_3O_4$, and $Y_2O_3$. Some examples of a carbide are SiC, TiC, and the like, some examples of a nitride are TiN, BN, AlN, $Si_3N_4$, and the like, some examples of a sulfide are PbS and the like, and some examples of a fluoride are $CaF_2$, $BaF_2$, and the like. Molybdenum alkyl thiophosphate, molybdenum alkyl thiocarbamate, and the like can be used as an organic molybdenum compound.

The average particle diameter of the solid lubricant contained in the lubricating film of the inorganic polymeric compound having an M—O backbone is preferably at least about 0.005 micrometers and at most 3.0 micrometers. If the average particle is less than 0.005 micrometers, the particles readily adhere to each other at the time of mixing and it becomes difficult to uniformly disperse them, and it becomes easy for galling to locally take place. If the particle diameter is greater than 3 micrometers, it is difficult to uniformly disperse them and it is easy for local galling to take place.

The mass ratio (B/A) of the content (B) of the solid lubricant to the content (A) of the resin or the inorganic compound having an M—O backbone is preferably at least 0.3 and at most 9.0. If the mass ratio is less than 0.3, the effect of the lubricating film which is formed on increasing lubricity is small, and the improvement in galling resistance is inadequate. If the mass ratio is larger than 9.0, there are the problems that the adhesion of the lubricating film decreases, and in particular peeling of the solid lubricant from the lubricating film becomes marked. More preferably, the mass ratio is at least 0.5 and at most 7.0.

Next, the thickness of a lubricating film according to the first through sixth inventions will be described.

The thickness of the lubricating film is preferably at least 5 micrometers and at most 30 micrometers. The solid lubricant contained in the lubricating film is subjected to a high surface pressure and spreads over the entire contact surface and exhibits an excellent galling resistance, but if the thickness of the lubricating film is less than 5 micrometers, the content of the solid lubricant becomes small and its effect of increasing lubricity is small. If the thickness of the lubricating film exceeds 30 micrometers, there are the problems such as that the amount of tightening becomes inadequate and the air tightness decreases, and that it becomes easy for galling to take place if the surface pressure is increased in order to guarantee air tightness. In addition, there is the drawback that it becomes easy for peeling of the lubricating film to take place. More preferably, the thickness of the lubricating film is at least 5 micrometers and at most 15 micrometers.

Next, a metal alkoxide used to form a lubricating film according to the first through sixth inventions and a dispersant for the metal alkoxide will be described.

As a metal alkoxide, a metal alkoxide having the basic molecular structure M(OR4) in which M is titanium, silicon, zirconium, manganese, cerium, barium, or the like, and R is a methyl, ethyl, isopropyl, propyl, isobutyl, butyl, or the like can be used.

As a dispersant for the metal alkoxide, a low boiling point liquid such as xylene, methylene chloride, isopropyl, butyl alcohol, or methyl ethyl ketone can be used either alone or in a combination of two or more.

Next, moistening treatment which is carried out during the process of forming a lubricating film according to the first through sixth inventions will be described.

Moistening treatment can be carried out by sitting in air for a prescribed length of time, but it is preferably carried out in an atmosphere having a humidity of at least 70 percent. In addition, heating is preferably carried out after a moistening treatment. The heating promotes co-hydrolysis, and it can promote the discharge from within the lubricating film of alkyls which are co-hydrolysis products, it makes the adhesion of the lubricating film strong, and it increases galling resistance. Heating is preferably carried out after vaporizing the dispersant. A suitable heating temperature is a temperature of 100–200° C. near the boiling point of the alkyl, and it is effective to blow hot air.

Embodiments of the present invention will be described in detail while referring to the attached drawings.

(First Embodiment)

One embodiment of a threaded joint of the first invention will be described in detail.

Figure 5:
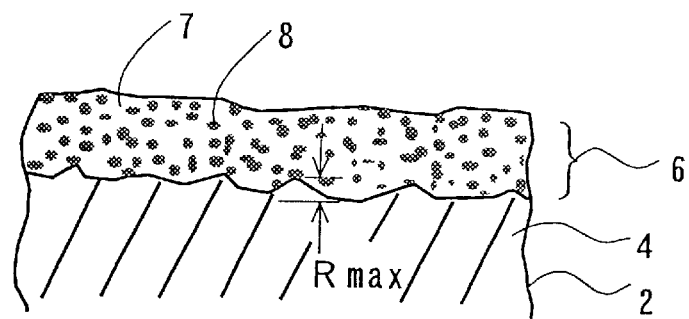
FIG. 5 is a typical cross-sectional view showing one example of the state of formation of a lubricating film according to the first invention.

FIG. 5 is an enlarged cross-sectional view of the unthreaded metal contact portion of a pin showing one example of the formed state of a lubricating film according to the first invention. Reference number 6 shows a lubricating film, 7 shows an inorganic polymeric compound having an M—O backbone, and 8 shows a solid lubricant. The same reference numbers as in FIG. 4 show the same elements.

As shown in FIG. 5, this threaded joint has a lubricating film 6 formed on the surface of the unthreaded metal contact portion 4 of the pin 2, and the lubricating film 6 is formed of a solid lubricant 8 dispersed and mixed in a inorganic polymeric compound 7 having an M—O backbone. FIG. 5 shows the case in which a lubricating film is formed on the unthreaded metal contact portion of a pin 2, but a lubricating film can be formed on the surface of the unthreaded metal contact portion of at least one of either the pin or the box.

The unthreaded metal contact portions have a higher contact surface pressure and more severe lubricating conditions than the threaded portions, and the threaded portions join the pin and the box to each other by threaded engagement, so galling resistance can be increased by forming a lubricating film on a metal contact portion of at least one of either the pin or the box. In the case of a threaded joint employing a high strength material and having a high contact pressure acting on the threads or in the case of a threaded joint made of an alloy having a large amount of alloying elements such as Cr or Ni, it is easy for galling to take place, so a lubricating film is preferably formed on the threads in addition to the metal contact portions.

The surface roughness Rmax of the portion on which the lubricating film is formed (the substrate) is preferably at least 3 micrometers and at most 15 micrometers. By imparting a suitable surface roughness as pretreatment at the time of forming a lubricating film, a so-called anchor effect in which the lubricating film formed thereon is physically grasped is increased, and peeling of the lubricating film is obstructed. If the surface roughness Rmax is less than 3 micrometers, the anchor effect is small and peeling of the lubricating film easily occurs. On the other hand, if the surface roughness exceeds 15 micrometers, at the time of tightening and loosening, the lubricating film tears where it is formed on projections of the roughness and galling easily takes place. More preferably the surface roughness is at least 4 micrometers and at most 10 micrometers. The surface roughness of the opposite portion where the lubricating film is not formed is preferably less than the surface roughness of the portion where the lubricating film is formed.

In a threaded joint according to the present invention, a rust preventing additive or a corrosion inhibitor may be added to the lubricating film in order to prevent the formation of rust while maintaining galling resistance. Known products may be used as a rust preventing additive or a corrosion inhibitor.

Next, a method of forming a lubricating film according to the present invention will be described.

In a method of forming a lubricating film according to this invention, a dispersant is added to a metal alkoxide and a solid lubricant, they are mixed and applied to the metal contact portion of at least one of either the pin or the box, moistening treatment is carried out to perform co-hydrolysis, and a lubricating film of an inorganic polymeric compound having an M—O backbone is formed.

The mixing ratio of the metal alkoxide and the solid lubricant is selected so that in a dry state after the lubricating film is formed, the mass ratio of the content (A) of the inorganic polymeric compound having an M—O backbone and the content (B) of the solid lubricant is at least 0.3 and at most 9.0.

When forming the lubricating film on a threaded joint according to the present invention, blasting is preferably performed in advance on the region where the lubricating film is to be performed to make the surface roughness Rmax of this region 3–15 $\mu$m. By performing blasting, a new active surface appears on the surface, the adhesion of the lubricating film becomes strong, and galling resistance is increased. Blasting may be carried out by the known sand blasting method, shot blasting method, grit blasting method, or the like, and it may be carried out by a method in which a hard material such as sand, shot, grit, cut wire, or the like is blown at a high speed.

(Second Embodiment)

An embodiment of a threaded joint of the second invention will be described in detail.

Figure 6:
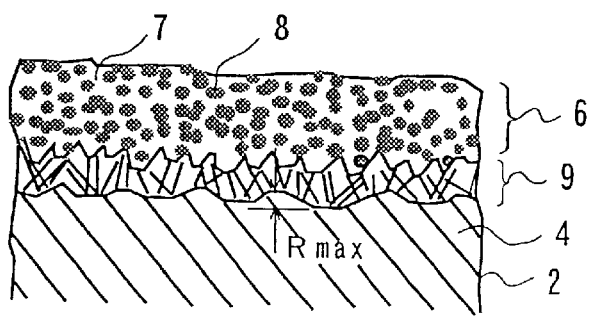
FIG. 6 is a typical cross-sectional view showing one example of the state of forming a lubricating film according to the second invention.

FIG. 6 is an enlarged cross-sectional view of the unthreaded metal contact portion of a pin showing one example of the formed state of a lubricating film according to the second invention. Reference number 6 shows a lubricating film, 7 shows an inorganic polymeric compound having an M—O backbone, 8 shows a solid lubricant, and 9 shows a phosphate film. The same elements as in FIG. 4 are shown by the same reference numbers.

As shown in FIG. 6, this threaded joint has a phosphate film 9 formed on the surface of the unthreaded portion 4 of a pin 2 and a lubricating film 6 formed atop the phosphate film 9. The lubricating film 6 is formed from a solid lubricant 8 dispersed and mixed in an inorganic polymeric compound 7 having an M—O backbone. In FIG. 6, the case is shown in which the phosphate filmed is formed on the unthreaded metal portion of a pin, but it may be formed on the unthreaded metal portion of at least one of either the pin or the box.

The unthreaded metal contact portions have a higher contact surface pressure and more severe lubricating conditions than the threaded portions, and the threaded portions join the pin and the box to each other by threaded engagement, so galling resistance can be increased by forming a lubricating film on a metal contact portion of at least one of either the pin or the box. In the case of a threaded joint employing a high strength material and having a high contact pressure acting on the threads, it is easy for galling to take place, so a lubricating film is preferably formed on the threads in addition to the metal contact portions.

A phosphate film is formed as pretreatment when forming the lubricating film. The phosphate film is a chemical conversion treatment film which is formed by a chemical reaction on the surface of the material forming the threaded joint, and it forms a structure in which fine crystal particles cover the surface. Accordingly, the adhesion of the underside of the chemical conversion treatment film to the material is extremely high, the so-called anchor effect which secures the lubricating film formed atop the chemical conversion treatment film is increased, and the adhesion of the lubricating film is increased.

Some examples of a phosphate film are chemical conversion treatment films of manganese phosphate, zinc phosphate, calcium phosphate, and zinc calcium phosphate. The geometric shapes of the crystals vary among these substances, with the crystals of manganese phosphate being the most minute and standing close together like a carpet. Accordingly, from the standpoint of increasing the anchor effect, a manganese phosphate film is preferred.

There is no particular limit on the thickness of the phosphate film, but if it is too thick, its effect on suppressing peeling of the lubricating film becomes small, while if it is too thick, cracks enter into the interior of the phosphate film and it falls off together with the lubricating film. Accordingly, the film thickness is preferably at least 3 micrometers and at most 10 micrometers.

The surface roughness Rmax of the unthreaded metal contact portion (substrate) on which the phosphate film is formed is preferably at least 3 micrometers and at most 15 micrometers. By imparting a suitable surface roughness by pretreatment when forming the phosphate film, the so-called anchor effect in which the phosphate film formed atop it is mechanically held is increased, and peeling of the phosphate film is obstructed. If the surface roughness Rmax is less than 3 micrometers, the anchor effect is small and the phosphate film easily peels off. On the other hand, if the surface roughness exceeds 15 micrometers, at that time of tightening and loosening, the lubricating film atop the phosphate film formed on projections of the roughness tears and galling easily takes place. A more preferred surface roughness is at least 4 micrometers and at most 10 micrometers. When the phosphate film is formed on only one of the surfaces, the surface roughness of the opposition portion on which the phosphate film is not formed is preferably less than the surface roughness of the above-described substrate.

In a threaded joint according to the present invention, a rust preventing additive or a corrosion inhibitor may be added to the lubricating film in order to prevent the formation of rust while maintaining galling resistance. Known products may be used as a rust preventing additive or a corrosion inhibitor.

This threaded joint is suitable as a threaded joint made of high carbon steel or a low alloy steel containing less than 10 mass percent of Cr.

Next, a method of forming a lubricating film according to this invention will be described.

In a method of forming a lubricating film according to this invention, chemical conversion treatment of the surface of the metal contact portion of at least one of either the pin or the box is carried out using a phosphate solution and a phosphate film is formed. Then, a dispersant is added to a metal alkoxide and a solid lubricant and mixing is performed, these are applied atop the phosphate film, moistening treatment is performed to carry out co-hydrolysis, and a lubricating film of an inorganic polymeric compound having an M—O backbone is formed.

The mixing ratio of the metal alkoxide and the solid lubricant is selected so that in a dry state after the lubricating film is formed, the mass ratio of the content (A) of the inorganic polymeric compound having an M—O backbone and the content (B) of the solid lubricant is at least 0.3 and at most 9.0.

When forming a phosphate film on a threaded joint according to the present invention, blasting is preferably performed in advance as pretreatment to give the substrate a surface roughness Rmax of 3–15 $\mu$m. By performing blasting, a new active surface appears on the surface, the adhesion of the phosphate film becomes strong, and the peeling resistance of the phosphate film is increased. Blasting may be carried out by the known sand blasting method, shot blasting method, grit blasting method, or the like, and it may be carried out by a method in which a hard material such as sand, shot, grit, cut wire, or the like is blown at a high speed.

(Third Embodiment)

Embodiments of a threaded joint according to the third invention and the fourth invention will be described in detail.

Figure 7:
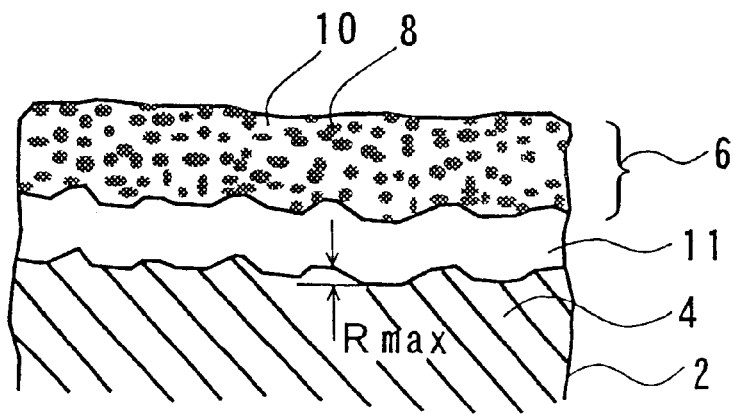
FIG. 7 is an enlarged cross-sectional view of the unthreaded metal contact portion of a pin showing one example of the state of formation of a lubricating film according to the third invention.

FIG. 7 is an enlarged cross-sectional view of the unthreaded metal contact portion of a pin showing one example of the formed state of a lubricating film according to the third invention. Reference number 6 shows a lubricating film, 8 shows a solid lubricant, 10 shows a polymeric compound, and 11 shows a Cu plating layer. The same elements as in FIG. 4 are shown by the same reference numbers.

Figure 8:
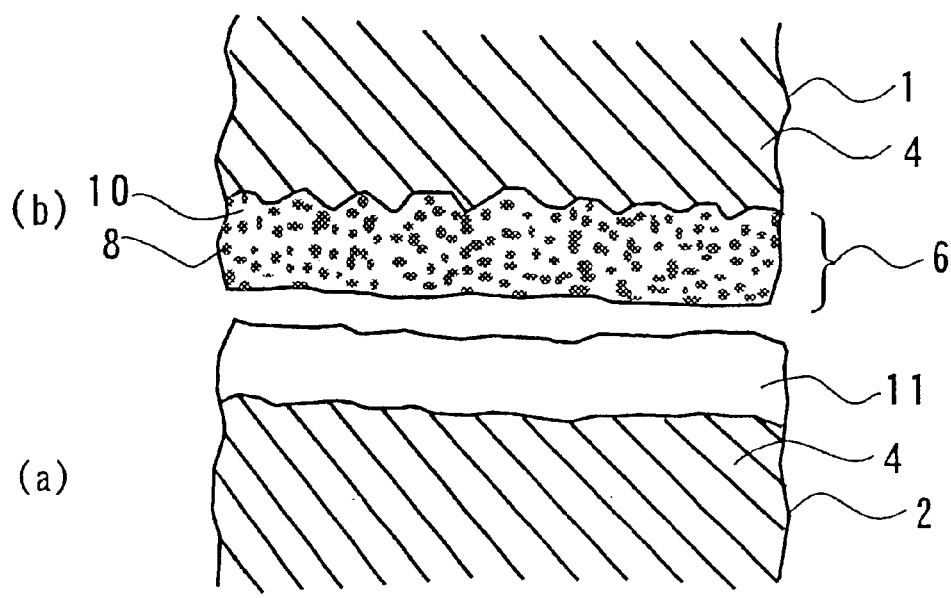
FIG. 8 is an enlarged cross-sectional view showing one example of the state of formation of a lubricating film according to the fourth invention, view (a) showing the unthreaded metal contact portion of a pin, and view (b) showing the unthreaded metal contact portion of a box.

FIG. 8 is an enlarged cross-sectional view showing an example of the formed state of a lubricating film according to the fourth invention. View (a) shows the unthreaded metal contact portion of a pin, and view (b) shows the unthreaded metal contact portion of a box. The same elements as in FIG. 4 are shown by the same reference numbers.

As shown in FIG. 7, a threaded joint according to the third invention has a Cu plating layer 11 formed on the surface of an unthreaded metal contact portion 4 of a pin 2 and a lubricating film 6 formed atop the Cu plating layer 11. The lubricating film 6 is formed of a solid lubricant 8 dispersed and mixed in a polymeric compound 10. This polymeric compound 10 is an inorganic polymeric compound having an M—O backbone. The polymeric compound may also be a resin. FIG. 7 shows the case in which the Cu plating layer 11 and the lubricating film 8 are formed on the unthreaded metal contact portion 4 of a pin 2, but they may be formed on the metal contact portion of at least one of either the pin or the box.

As shown in FIGS. 8 (a) and (b), a threaded joint of the fourth invention has a Cu plating layer 11 formed on the surface of the unthreaded metal contact portion 4 of a pin 2, and a lubricating film 6 formed on the surface of the unthreaded metal contact portion 4 of a box 1. The lubricating film 6 is formed of a solid lubricant 8 dispersed and mixed in a polymeric compound 10. The polymeric compound 10 is an inorganic polymeric compound having an M—O backbone. The polymeric compound 10 may also be a resin. In the illustrated example, the case is shown in which the Cu plating layer and the lubricating film are respectively formed on the unthreaded metal contact portion of the pin and the box, but the Cu plating layer may be formed on the unthreaded metal contact portion of the box, and the lubricating film may be formed on the unthreaded metal contact portion of the pin.

The unthreaded metal contact portions have a higher contact surface pressure and more severe lubricating conditions than the threaded portions, and the threaded portions join the pin and the box to each other by threaded engagement, so galling resistance can be increased by forming a lubricating film on a metal contact portion of at least one of either the pin or the box. In the case of a threaded joint employing a high strength material and having a high contact pressure acting on the threads or in the case of a threaded joint made of an alloy having a large amount of alloying elements such as Cr or Ni, it is easy for galling to take place, so a lubricating film is preferably formed on the threads in addition to the metal contact portions.

The Cu plating layer may be formed by electroplating or electroless plating, but it may also be formed by hot dipping. There is no particular limit on the thickness of the Cu plating layer, but it is preferably at least 5 micrometers and at most 15 micrometers, and more preferably at most 10 micrometers.

By forming a lubricating film atop the Cu plating layer, or by forming a Cu plating layer on one of the pin and the box and forming the lubricating layer on the other, the solid lubricant which is dispersed in the lubricating film is maintained stable even under high temperature conditions, so galling resistance is improved. Namely, the Cu plating layer is soft and is pressed and deformed by tightening of the threaded joint, but with just a Cu plating layer, the coefficient of friction at the time of tightening becomes large, and a prescribed amount of tightening is difficult. Furthermore, with just a lubricating film, it is difficult to maintain the solid lubricant stable under high temperature conditions. By combining a Cu plating layer with a lubricating film in which a solid lubricant is dispersed, the coefficient of friction decreases, a low tightening force becomes possible, and the occurrence of galling can be suppressed.

When the lubricating film is formed atop a Cu plating layer, the surface roughness Rmax of the Cu plating layer is preferably at least 3 micrometers and at most 15 micrometers. By imparting a suitable roughness to the surface of the Cu plating layer, the so-called anchor effect in which the lubricating film which is formed thereon is mechanically retained is increased and peeling of the lubricating film is obstructed. If the surface roughness Rmax is less than 3 micrometers, the anchor effect is small and the lubricating film easily peels off. On the other hand, if the surface roughness exceeds 15 micrometers, at the time of tightening and loosening, the lubricating film which is formed on projections of the roughness tear and galling easily takes place. More preferably, the surface roughness is at least 4 micrometers and at most 10 micrometers.

A threaded joint according to the present invention can maintain galling resistance while preventing rusting by the addition of a rust preventing agent or a corrosion inhibitor to the lubricating film. The rust preventing agent and the corrosion inhibitor may be known ones.

Next, a method for forming a lubricating film according to the present invention will be described by using an example in which a lubricating film of an inorganic polymeric compound having an M—O backbone is formed atop a Cu plating layer.

When forming a lubricating film according to this invention, a Cu plating layer is formed by carrying out electroplating on the surface of the metal contact portion of at least one of either the pin or the box. Next, a dispersant is added to a metal alkoxide and a solid lubricant and mixing is performed, these are applied atop the Cu plating layer, moistening treatment is carried out to perform co-hydrolysis, and a lubricating film of an inorganic polymeric compound having an M—O backbone is formed. When forming a lubricating film of a resin, a dispersant is added to an organic polymeric compound, such as a thermosetting resin, and a solid lubricant and mixing is performed, and this can be applied atop the Cu plating layer to form a lubricating film.

The mixing ratio of a metal alkoxide or a resin and a solid lubricant is set such that in a dry state after forming the lubricating film, the mass ratio of the content (A) of the inorganic polymeric compound having an M—O backbone or a resin and the content (B) of the solid lubricant is at least 0.3 and at most 9.0.

In a threaded joint according to the present invention, in order to make the surface roughness Rmax of the layer of Cu plating 3–15 $\mu$m, it is preferable to perform blasting to form irregularities on the surface either as pretreatment prior to forming the layer of Cu plating or after forming the layer of Cu plating. By performing blasting, a new active surface appears on the surface, the adhesion of the lubricating film becomes strong, and the peeling resistance of the lubricating film is increased. Blasting may be carried out by the known sand blasting method, shot blasting method, grit blasting method, or the like, and it may be carried out by a method in which a hard material such as sand, shot, grit, cut wire, or the like is blown at a high speed.

(Fourth Embodiment)

An embodiment of a threaded joint according to the fifth invention and the sixth invention will be described in detail.

First, the components of a rust preventing oil composition forming a rust preventing film according to these inventions and their properties will be described.

a. Metal Salt of a Carboxylic Acid

A rust preventing oil composition according to the above-described invention contains at least one of an alkali metal salt of a carboxylic acid and an alkali earth metal salt of a carboxylic acid. These metal salts have excellent rust preventing properties, and they also have excellent lubricity.

Some examples of an alkali metal are sodium, lithium, and potassium, and some examples of an alkali earth metal are calcium, magnesium, and barium. As a carboxylic acid, a monocarboxylic acid having one carboxyl group or a dicarboxylic acid having 2 carboxyl groups is suitable, and the number of carbon atoms in the hydrocarbon radical is preferably 5–19 from the standpoints of lubricity and rust prevention. Some examples of a monocarboxylic acid are caproic acid, caprylic acid, capric acid, lauric acid, tridecylic acid, myristic acid, palmitic acid, stearic acid, isostearic acid, oleic acid, linolic acid, linolenic acid, naphthenic acid, and benzoic acid. Suitable dicarboxylic acids include suberic acid, azelaic acid, and sebacic acid.

b. Content of an alkali metal and alkali earth metal

Figure 1:
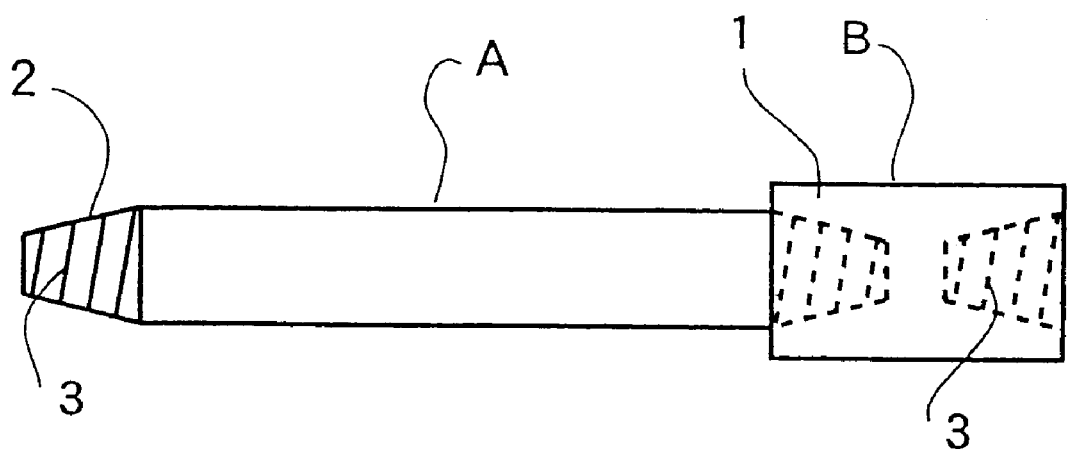
FIG. 1 is a schematic view showing the typical assembled structure of an oil well pipe and a threaded coupling at the time of shipment of the oil well pipe.
Figure 2A:
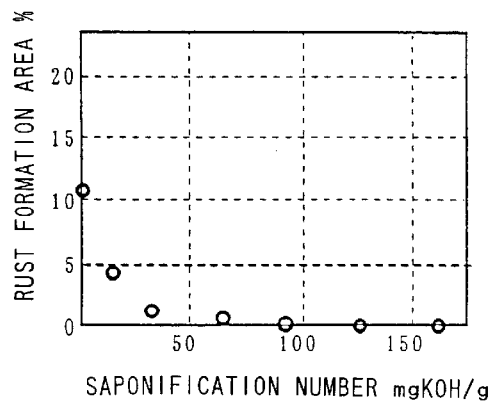
FIG. 2 shows graphs indicating the relationship between the area in which rusting occurred in a salt spray test and the saponification number, the total base number, the alkali metal content, and the thickness of a rust preventing film. In the figure, (a) is a graph of the area of rust formation and saponification number, (b) is a graph of the area of rust formation and the total base number, (c) is a graph of the area of rust formation and the alkali metal content, and (d) is a graph of the area of rust formation and the thickness of a rust preventing film.
Figure 2C:
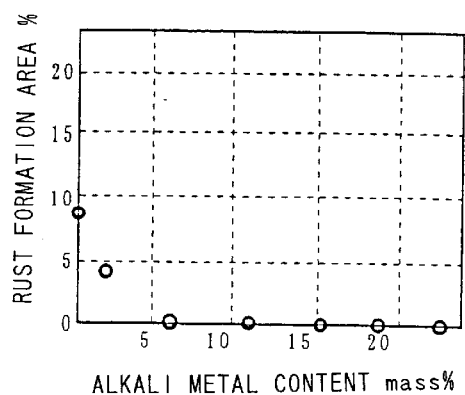
Figure 3A:
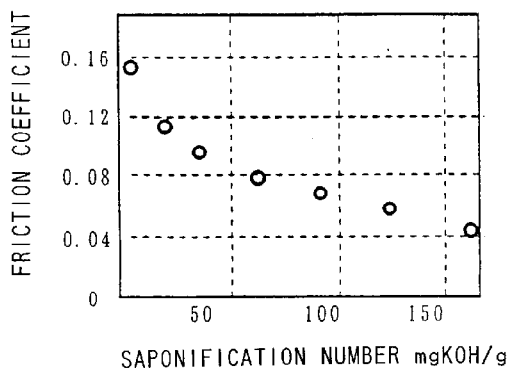
FIG. 3 shows graphs of the relationship between the coefficient of friction in a friction test and the saponification number, the total base number, the alkali metal content, and the thickness of a rust preventing film. In the figure, (a) is a graph showing the coefficient of friction and the saponification number, (b) is a graph showing the coefficient of friction and the total base number, (c) is a graph showing the coefficient of friction and the alkali metal content, and (d) is a graph showing the coefficient of friction and the thickness of a rust preventing film.
Figure 3C:
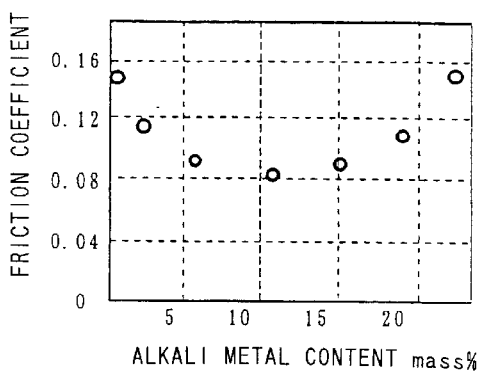

The total content of the alkali metal and the alkali earth metal is preferably at least 2 mass percent and at most 20 mass percent. If the content is less than 2 mass percent or greater than 20 mass percent, as shown in FIG. 3(c), the coefficient of friction becomes large and the lubricity decreases. Furthermore, if it is less than 2 mass percent, as shown in FIG. 2(c), the rust preventing properties become poor and rusting easily takes place. Accordingly, by forming a rust preventing film of a rust preventing oil composition in which the above-described content is at least 2 mass percent and at most 20 mass percent on a threaded joint, the rust preventing properties of the threaded joint can be increased, and the galling resistance can be increased. The above-described content can be analyzed for each element by atomic adsorption or the like.

c. Saponification number

The saponification number of the rust preventing oil composition is preferably at least 20 mgKOH/g and at most 150 mgKOH/g. If the saponification number is less than 20 mgKOH/g, as shown in FIG. 2(a), the rust preventing properties are poor and rust is easily formed, and as shown in FIG. 3(a), the coefficient of friction becomes large and lubricity decreases. In addition, if the saponification number exceeds 150 mgKOH/g, the rust preventing film hardens, and it becomes easy for cracks to form. As a result, peeling in the shape of flakes occurs and rust preventing properties worsen. Accordingly, by forming a rust preventing film of a rust preventing oil composition having a saponification number of at least 20 mgKOH/g and at most 150 mgKOH/g on a threaded joint, rust preventing properties can be improved, and galling resistance can be increased.

d. Total Base Number

The total base number of the rust preventing oil composition is preferably at least 15 mgKOH/g and at most 100 mgKOH/g.

Figure 2B:
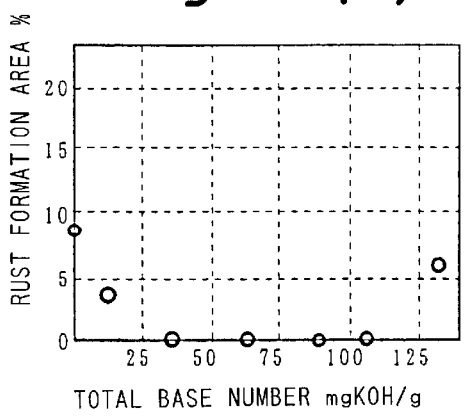
Figure 2D:
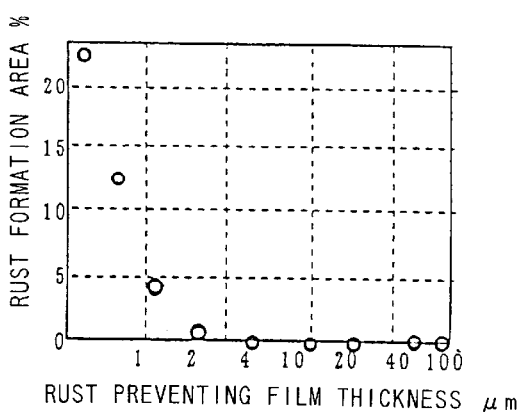
Figure 3B:
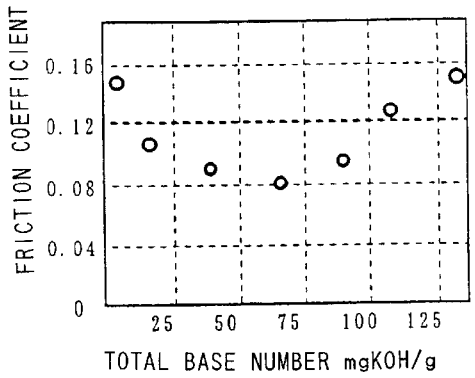
Figure 3D:
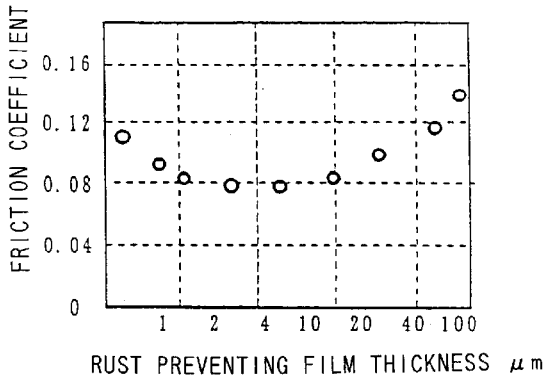

If the total base number is less than 15 mgKOH/g, as shown in FIG. 2(b), rust preventing properties become poor and rust easily forms. Furthermore, as shown in FIG. 3(b), the coefficient of friction becomes large and lubricity decreases. Furthermore, if the total base number is greater than 100 mgKOH/g, as shown in FIG. 3(b), the coefficient of friction becomes large and lubricity decreases. Accordingly, by forming a rust preventing film of a rust preventing oil composition having a total base number of at least 15 mgKOH/g and at most 100 mgKOH/g on a threaded joint, rust preventing properties can be improved and galling resistance can be increased.

e. Lubricant

The rust preventing oil composition preferably contains 5–30 mass percent of one or a mixture of two or more of the lubricants; graphite, molybdenum disulfide, and an organic molybdenum compound. These lubricants have the effect of increasing the lubricity of the rust preventing oil composition and of increasing galling resistance. Some examples of an organic molybdenum compound are molybdenum dialkyl thiophosphate and molybdenum dialkyl thiocarbamate.

If the content of the lubricant is less than 5 mass percent, its effect on increasing lubricity is small, while if it exceeds 30 mass percent, the formation of a film of the rust preventing oil is obstructed, the film becomes porous, and the rust preventing properties worsen. The average particle diameter of the lubricant is preferably at least 0.4 micrometers and at most 3 micrometers. If it is less than 0.4 micrometers, the effect on increasing lubricity is small, and if it exceeds 3 micrometers, the rust preventing properties worsen.

In addition to the above-described metal salt of a carboxylic acid and a lubricant, a rust preventing oil composition according to the present invention may also include an alkali metal salt of a sulfonic acid, an alkali earth metal salt of a sulfonic acid, a paraffin wax, an ester of a wax oxide, a higher aliphatic acid monoester, natural wax, and the like.

An alkali metal salt or an alkali earth metal salt of a sulfonic acid is basic and has excellent rust preventing properties. Some examples are an alkali metal salt or an alkali earth metal salt or an amine salt of a petroleum sulfonic acid or a synthetic sulfonic acid obtained by sulfonation of the aromatic component of a petroleum distillate. Some examples of a synthetic sulfonic acid are dodecyl benzene sulfonic acid and dinonyl naphthalene sulfonic acid.

As a paraffin wax, one having a molecular weight of 150–500 is suitable.

Some examples of a higher fatty acid monoester are synthetic monoesters of a carboxylic acid such as myristic acid, palmitic acid, stearic acid, elaidic acid, arachic acid, behenic acid, erucic acid, lignoceric acid, cerotic acid, montanic acid, and lanolic acid, with octyl alcohol, capryl alcohol, nonyl alcohol, decyl alcohol, lauryl alcohol, tridecyl alcohol, myristyl alcohol, cetyl alcohol, stearyl alcohol, isostearyl alcohol, oleyl alcohol, decyl alcohol, ceryl alcohol, melissyl alcohol, or the like.

Some examples of a natural wax are carnauba wax, lanolin, beeswax, Japan wax, and montan wax.

A mineral oil or a synthetic mineral oil having a viscosity at 40° C. of 10–50 cSt may be added to a rust preventing composition according to the present invention.

Next, a threaded joint according to the fifth invention and the sixth invention will be described.

Figure 9:
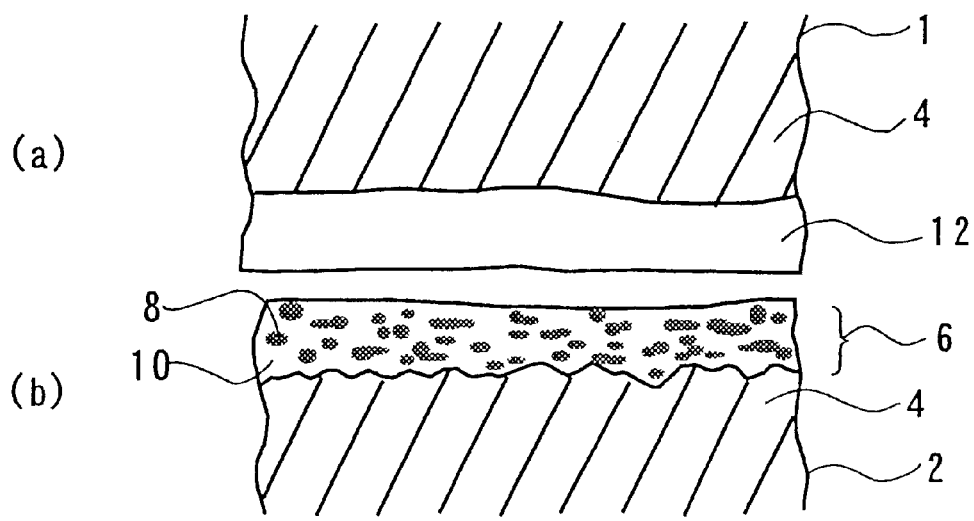
FIG. 9 is an enlarged cross-sectional view showing the state of formation of a lubricating film and a rust preventing film according to the fifth invention, view (a) showing the unthreaded metal contact portion of a pin, and view (b) showing the unthreaded metal contact portion of a box.

FIG. 9 is an enlarged cross-sectional view showing the formed state of a lubricating film and a rust preventing film according to the fifth invention. FIG. 9(a) shows the unthreaded metal contact portion of a box, and FIG. 9(b) shows the unthreaded metal contact portion of a pin. Reference number 6 shows a lubricating film, 8 shows a solid lubricant, 10 shows a polymeric compound, and 12 shows a rust preventing film. The same elements as in FIG. 4 are indicated by the same reference numbers.

Figure 10:
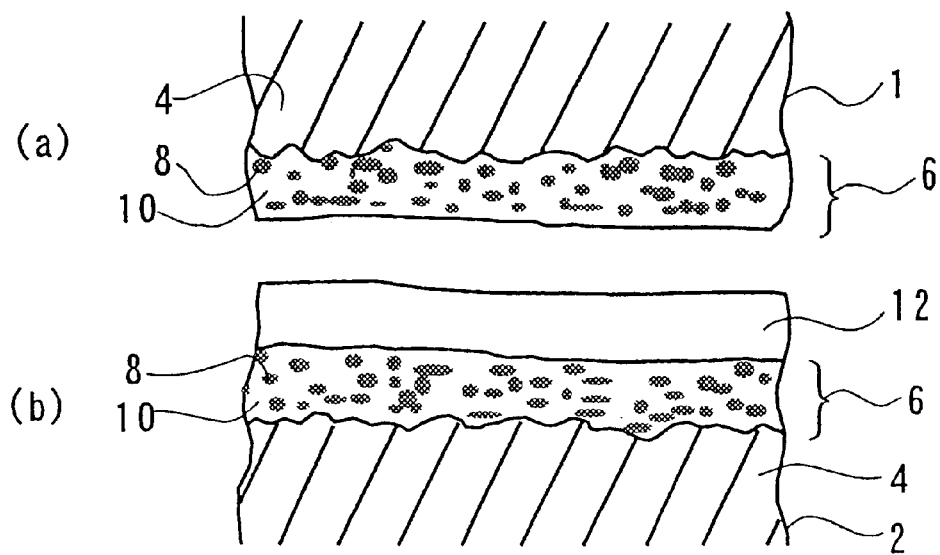
FIG. 10 is an enlarged cross-sectional view showing the state of formation of a lubricating film and a rust preventing film according to the sixth invention, view (a) showing the unthreaded metal contact portion of a pin, and view (b) showing the unthreaded metal contact portion of a box.

FIG. 10 is an enlarged cross-sectional view showing the formed state of a lubricating film and a rust preventing film according to the sixth invention. FIG. 10(a) shows the unthreaded metal contact portion of a box, and FIG. 10(b) shows the unthreaded metal contact portion of a pin. The same elements as in FIG. 4 are shown by the same reference numerals.

As shown in FIGS. 9(a) and (b), a threaded joint according to the fifth invention has a lubricating film 6 formed on the surfaces of both the threaded portion and the unthreaded metal contact portion 4 of the pin 2, and a rust preventing film 12 formed on the surface of both the threaded portion and the unthreaded metal contact portion 4 of the box 1. The lubricating film 6 comprises a polymeric compound 10 in which a solid lubricant 8 is dispersed and mixed, and the polymeric compound 10 is an inorganic polymeric compound having an M—O backbone. The polymeric compound 10 may also be a resin. In the illustrated example, the case is shown in which a lubricating film 6 is formed on the pin 2 and a rust preventing film 12 is formed on the box 1, but the rust preventing film may also be formed atop the lubricating film. In addition, a rust preventing film may be formed on the pin and a lubricating film may also be formed on the box, and a rust preventing film may be formed atop the lubricating film.

As shown in FIGS. 10(a) and 10(b), a threaded joint according to the sixth invention is constituted in the same manner as in FIG. 4, and it has a lubricating film 6 formed on the surface of both the threaded portion and the unthreaded metal contact portion 4 of both the pin 2 and the box 1, and a rust preventing film 12 formed atop the lubricating film 6 formed on the surface of the pin 2. The lubricating film 6 comprises a polymeric compound 10 in which a solid lubricant 8 is dispersed and mixed, and the polymeric compound 10 is an inorganic polymeric compound having an M—O backbone. The polymeric compound 10 may also be a resin. In the illustrated example, the case is shown in which a rust preventing film is formed on the pin, but a rust preventing film may be formed on the box.

The rust preventing film is a film comprising a rust preventing oil composition formed by applying a rust preventing oil obtained by diluting the above-described rust preventing oil composition with a solvent. The rust preventing oil composition contains at least one of an alkali metal salt of a carboxylic acid or an alkali earth metal salt of a carboxylic acid. The total content of the alkali metal and the alkali earth metal in the rust preventing oil composition is 2–20 mass percent, the saponification number of the rust preventing oil composition is preferably 20–150 mgKOH/g, and the total base number is preferably 15–100 mgKOH/g. In addition, it preferably includes 5–30 mass percent of a lubricant selected from one or more of graphite, molybdenum disulfide, and an organic Mo compound.

If the thickness of the rust preventing film is too small, the rust preventing effect is small, and if it is too large, the lubricating effect of the lubricating film is obstructed, the coefficient of friction increases, and galling occurs. Accordingly, the thickness of a rust preventing film which is formed atop a lubricating film as shown in FIG. 10(b) is preferably at least 1 micrometer and at most 50 micrometers. The thickness of a rust preventing film formed on a pin or a box as shown in FIG. 9(a) is preferably at least 5 micrometers and at most 50 micrometers. When a rust preventing film is formed atop a lubricating film, the rust preventing effect of the lubricating film acts, so the lower limit on the thickness of the rust preventing film can be decreased.

Next, a method of forming a lubricating film and a rust preventing film according to the present invention will be described taking as an example the case in which a lubricating film of an inorganic polymeric compound having an M—O backbone is formed on both the pin and the box, and a rust preventing film is formed atop the lubricating film.

When forming a lubricating film, a dispersant is added to a metal alkoxide and a solid lubricant and mixing is performed, these substances are applied to the surface of both a pin and a box, moistening treatment is further carried out to perform co-hydrolysis, and a lubricating film of an inorganic polymeric compound having an M—O backbone is formed. When forming a lubricating film of a resin, for example, a dispersant is added to an organic polymeric material such as a thermosetting resin and a solid lubricant and mixing is performed, and these materials can be applied in the same manner as described above. Then, a rust preventing oil comprising a rust preventing oil composition according to the present invention diluted with an organic solvent is applied atop the lubricating film, and a rust preventing film is formed.

There are no particular restrictions on the inorganic solvent of a rust preventing composition. For example, various solvents, gasoline, benzene, kerosene, hexane, and the like can be used.

A rust preventing oil composition is diluted with an organic solvent preferably to have a viscosity at 40° C. of at least 2 cSt and at most 30 cSt. If the viscosity is less than 2 cSt, the thickness of the rust preventing film becomes too small, and adequate rust preventing properties are not obtained. If it exceeds 30 cSt, the rust preventing film becomes too thick, the effect of increasing lubricity by the formation of the lubricating film decreases, and it becomes easy for galling to take place. The amount of the organic solvent in the rust preventing oil is preferably at least 30 mass percent and at most 80 mass percent.

EXAMPLES

The present invention will be described in further detail while referring to examples. Below, the surfaces of both the threaded portion and the metal contact portion of a pin will be referred to as the pin surface, and the surfaces of both the threaded portion and the metal contact portion of a box will be referred to as the box surface.

Example 1

A lubricating film of an inorganic polymeric compound having a Ti—O backbone was formed on the box surface and the pin surface of a threaded joint (outer diameter: 7 inches, wall thickness: 0.408 inches) made of a carbon steel, Cr steel, or high alloy steel having the compositions shown in Table 1. Tables 2 and 3 show surface treatment conditions such as the formation of a lubricating film and pretreatment. In the tables, Test Numbers 10–12 are ones in which a resin film was formed as a lubricating film, and Test Numbers 13 and 14 are ones in which a compound grease was applied.

TABLE 1

| No. | C | Si | Mn | P | S | Cu | Ni | Cr | Mo | Steel type |
|---|---|---|---|---|---|---|---|---|---|---|
| A | 0.24 | 0.30 | 1.30 | 0.02 | 0.01 | 0.04 | 0.07 | 0.17 | 0.04 | Carbon steel |
| B | 0.19 | 0.25 | 0.80 | 0.02 | 0.01 | 0.04 | 0.1 | 13.0 | 0.04 | Cr steel |
| C | 0.02 | 0.30 | 0.50 | 0.02 | 0.01 | 0.50 | 7.0 | 25.0 | 3.2 | High alloy steel |

(Notes)
Content is in mass %.
Remainder is Fe and unavoidable impurities.

TABLE 2

| Test No. | Pin Pretreatment | Pin Lubricating film | Box Pretreatment | Box Lubricating film |
|---|---|---|---|---|
| 1 | AsM (R = 3) | None | AsM (R = 3) | Ti-O (M = 1) $MoS_2$ (M = 1) graphite (M = 1) t = 40 |
| 2 | AsM (R = 2) | None | SB (R = 10) | Ti-O (M = 1) $MoS_2$ (M = 3) graphite (M = 2) t = 10 |
| 3 | GB (R = 15) | Ti-O (M = 1) $MoS_2$ (M = 5) graphite (M = 1.5) t = 20 | AsM (R = 2) | None |
| 4 | SB (R = 3) | Ti-O (M = 1) $MoS_2$ (M = 3) t = 8 | SB (R = 3) | Ti-O (M = 1) $MoS_2$ (M = 3) t = 8 |
| 5 | AsM (R = 2) | None | AsM (R = 2) | Ti-O (M = 1) $MoS_2$ (M = 2.5) graphite (M = 1.5) t = 30 |
| 6 | SB (R = 5) | Ti-O (M = 1) $MoS_2$ (M = 0.35) t = 20 | SB (R = 5) | Ti-O (M = 1) $MoS_2$ (M = 0.35) t = 20 |
| 7 | SB (R = 10) | Ti-O (M = 1) $MoS_2$ (M = 5.5) graphite (M = 3.5) t = 20 | AsM (R = 2) | None |
| 8 | SB (R = 4) | Ti-O (M = 1) $MoS_2$ (M = 5) graphite (M = 1.5) t = 5 | SB (R = 4) | Ti-O (M = 1) $MoS_2$ (M = 5) graphite (M = 1.5) t = 5 |
| 9 | AsM (R = 2) | Ti-O (M = 1) $MoS_2$ (M = 2) graphite (M = 1.5) t = 10 | AsM (R = 2) | Ti-O (M = 1) $MoS_2$ (M = 2) graphite (M = 1.5) t = 15 |

(Notes)
AsM: grinding,
GB: grit blasting,
SB: sand blasting
Ti-O: inorganic polymeric compound with Ti-O backbone
R: surface roughness Rmax (μm),
t: film thickness (μm)
M: relative content when content of inorganic polymeric compound with Ti-O backbone is 1

TABLE 3

| Test No. | Pin Pretreatment | Pin Lubricating film | Box Pretreatment | Box Lubricating film |
|---|---|---|---|---|
| 10 | SB (R = 10) | epoxy resin (M = 1) $MoS_2$ (M = 1) t = 20 | SB (R = 10) | epoxy resin (M = 1) $MoS_2$ (M = 1) t = 20 |
| 11 | AsM (R = 2) | None | N (t = 2) P-Mn (t = 15) | polyamide-imide resin (M = 1) $WS_2$ (M = 1) t = 35 |
| 12 | SB (R = 10) | epoxy resin (M = 1) $MoS_2$ (M = 1) t = 30 | AsM (R = 2) | None |
| | P-Mn (t = 15) | | | |
| 13 | AsM (R = 2) | compound grease: (approx. 20 g/d m²) | AsM (R = 2) | Cu-P (t = 10) compound grease: (approx. 20 g/d m²) |
| 14 | AsM (R = 2) | compound grease: (approx. 20 g/d m²) | SB (R = 10) | P-Mn (t = 15) compound grease: (approx. 20 g/d m²) |

(Notes)
AsM: grinding,
SB: sand blasting
R: surface roughness Rmax (μm),
t: film thickness (μm)
M: relative content when content of epoxy resin or polyamide-imide resin is 1
N: nitriding,
P-Mn: manganese phosphate,
Cu-P: Cu plating Next, using a threaded joint on which the above-described surface treatment was performed, tightening and loosening was carried out a maximum of 20 times as summarized in Table 4, and the occurrence of galling was investigated.

TABLE 4

| | |
|---|---|
| 1st–10th time | tightening and loosening at room temperature |
| 11th time | heating for 24 hr at 400° C. after tightening at room temperature, followed by cooling to room temperature then loosening |
| 12th–15th time | tightening and loosening at room temperature |
| 16th time | heating for 24 hr at 400° C. after tightening at room temperature, followed by cooling to room temperature then loosening |
| 17th–20th time | tightening and loosening at room temperature |

Namely, as shown in Table 4, tightening and loosening were performed 1st–10th times, 12th–15th times, and 17th–20th times at room temperature, and after tightening the 11th time and 16th time at room temperature, heat treatment was carried out at 400° C. for 24 hours, cooling was then performed, and loosening was carried out at room temperature. The tightening speed and the tightening torque are shown in Table 5.

TABLE 5

| tightening speed | 10 rpm |
|---|---|
| tightening torque | 10340 ft · lbs |

Table 6 shows the occurrence of galling and the tightened state. The surface roughness is indicated by Rmax.

TABLE 6

| Test No. | Occurrence of galling (value: number of tightenings) | | | | | | | | | | | | | | Tightened condition |
|---|---|---|---|---|---|---|---|---|---|---|---|---|---|---|---|
| | 7 | 8 | 9 | 10 | 11 | 12 | 13 | 14 | 15 | 16 | 17 | 18 | 19 | 20 | |
| 1 | ○ | ○ | ○ | ○ | ○ | ○ | ○ | ○ | ○ | ○ | X | — | — | — | Good |
| 2 | ○ | ○ | ○ | ○ | ○ | ○ | ○ | ○ | ○ | ○ | ○ | ○ | ○ | ○ | Good |
| 3 | ○ | ○ | ○ | ○ | ○ | ○ | ○ | ○ | ○ | ○ | ○ | ○ | ○ | Δ | Good |
| 4 | ○ | ○ | ○ | ○ | ○ | ○ | ○ | ○ | ○ | ○ | ○ | ○ | ○ | ○ | Good |
| 5 | ○ | ○ | ○ | ○ | ○ | ○ | ○ | ○ | ○ | ○ | ○ | ○ | ○ | X | Good |
| 6 | ○ | ○ | ○ | ○ | ○ | ○ | ○ | ○ | ○ | ○ | ○ | ○ | ○ | Δ | Good |
| 7 | ○ | ○ | ○ | ○ | ○ | ○ | ○ | ○ | ○ | ○ | ○ | ○ | ○ | ○ | Good |
| 8 | ○ | ○ | ○ | ○ | ○ | ○ | ○ | ○ | ○ | ○ | ○ | ○ | ○ | ○ | Good |
| 9 | ○ | ○ | ○ | ○ | ○ | ○ | ○ | ○ | ○ | ○ | ○ | ○ | ○ | ○ | Good |
| 10 | ○ | ○ | ○ | ○ | ○ | Δ | X | — | — | — | — | — | — | — | inadequate tightening on 12th time |
| 11 | ○ | ○ | ○ | ○ | ○ | ○ | ○ | X | — | — | — | — | — | — | inadequate tightening on 12th time |
| 12 | ○ | ○ | ○ | ○ | ○ | X | — | — | — | — | — | — | — | — | |
| 13 | ○ | ○ | ○ | ○ | ○ | Δ | X | — | — | — | — | — | — | — | inadequate tightening on 12th time |
| 14 | ○ | Δ | Δ | Δ | X | X | — | — | — | — | — | — | — | — | |

(Notes)
○: no occurrence of galling, Δ: light occurrence (surface adjustment possible)
X: much occurrence (surface adjustment not possible), —: not carried out (1) Test Number 1

The following surface treatment was performed on a threaded joint of the carbon steel shown in Table 1. The pin surface and the box surface were finished by machine grinding to give both a surface roughness of 3 μm. Titanium alkoxide in which the alkyl group was methyl was mixed with molybdenum disulfide powder having an average particle diameter of 1.5 μm and graphite powder having an average particle diameter of 3.5 μm with a mass ratio of 0.77 parts of molybdenum disulfide and 0.77 parts of graphite per 1 part of titanium alkoxide, and this was applied to the box surface using a liquid mixture of xylene, methylene chloride, and butyl alcohol as a dispersant. After next being left in the atmosphere for 6 hours, when the composition of the film in a dry state was measured, the content expressed as a relative value of the mass was 1 part of molybdenum disulfide and 1 part of graphite to 1 part of an inorganic compound having a Ti—O backbone. The thickness of the film was 40 μm.

As shown in Table 6, there was no occurrence of galling up to the 16th tightening and loosening of Table 4, and the results were satisfactory. However, galling occurred upon tightening for the 17th time.

(2) Test Number 2

The following surface treatment was performed on a threaded joint of the carbon steel shown in Table 1. The pin surface was finished by machine grinding to a surface roughness of 2 μm. Number 80 sand was blown at the box surface to obtain a surface roughness of 10 μm. Titanium alkoxide in which the alkyl group was ethyl was mixed with molybdenum disulfide powder having an average particle diameter of 1.8 μm and graphite powder having an average particle diameter of 2.8 μm with a mass ratio of 2 parts of molybdenum disulfide and 1.33 parts of graphite per 1 part of titanium alkoxide, and this was applied to the box surface using a liquid mixture of xylene, methylene chloride, and butyl alcohol as a dispersant. Then, after sitting in the atmosphere for 3 hours, hot air at 165° C. was blown for 30 minutes. When the composition of the film in a dry state was measured, the content in mass proportion was 3 parts of molybdenum disulfide and 2 parts of graphite with respect to 1 part of an inorganic polymeric compound having a Ti—O backbone. The film thickness was 40 μm.

As shown in Table 6, when tightening and loosening was repeated 20 times as shown in Table 4, there was no occurrence of galling and the results were extremely good. The amount of tightening and the tightening torque at the time of tightening were both suitable.

(3) Test Number 3

The following surface treatment was performed on a threaded joint of the Cr steel shown in Table 1. The box surface was finished by machine grinding to a surface roughness of 2 μm. Number 80 grit was blown at the pin surface to obtain a surface roughness of 15 μm. Titanium alkoxide in which the alkyl group was isopropyl was mixed with molybdenum disulfide powder having an average particle diameter of 4.6 μm and graphite powder having an average particle diameter of 1.3 μm with a mass ratio of 2.77 parts of molybdenum disulfide and 0.83 parts of graphite per 1 part of titanium alkoxide, and this was applied to the box surface using a liquid mixture of methylethyl ketone, methylene chloride, and butyl alcohol as a dispersant. Then, after sitting for 3 hours in the atmosphere, hot air at 150° C. was blown for ten minutes. When the composition of the film in a dry state was measured, the content expressed as a mass proportion was 5 parts of molybdenum disulfide and 1.5 parts of graphite per 1 part of an inorganic polymeric compound having a Ti—O backbone. The film thickness was 20 μm.

As shown in Table 6, there was no occurrence of galling when tightening and loosening was performed 19 times as shown in Table 4. However, light galling occurred when tightening was performed the 20th time. However, it was determined that further repeated use was possible with surface adjustment. The amount of tightening and the tightening torque at the time of tightening were suitable.

(4) Test Number 4

The following surface treatment was performed on a threaded joint of the high alloy steel shown in Table 1. Number 180 sand was blown at the pin surface and the box surface to give both a surface roughness of 3 µm. Titanium alkoxide in which the alkyl group was methyl was mixed with molybdenum disulfide powder having an average particle diameter of 1.2 µm with a mass ratio of 2.31 parts of molybdenum disulfide per 1 part of titanium alkoxide, and this was applied to the pin surface and the box surface using a liquid mixture of xylene, methylene chloride, and butyl alcohol as a dispersant. Then, after sitting in the atmosphere for 3 hours, hot air at 165° C. was blown for 30 minutes. When the composition of the film in a dry state was measured, the content expressed as a mass proportion for both the pin and the box was 3 parts molybdenum disulfide per 1 part of an inorganic polymeric compound having a Ti—O backbone. The film thickness was 8 µm.

As shown in Table 6, when tightening and loosening was performed 20 times as shown in Table 4, there was no occurrence of galling and the results were extremely good. The amount of tightening and the tightening torque at the time of tightening were both suitable.

(5) Test Number 5

The following surface treatment was performed on a threaded joint of the carbon steel shown in Table 1. The pin surface and the box surface were finished by machine grinding to a surface roughness of 2 µm. Titanium alkoxide in which the alkyl group was isobutyl was mixed with molybdenum disulfide powder having an average particle diameter of 3.1 µm and graphite powder having an average particle diameter of 3.5 µm with a mass ratio of 1.39 parts of molybdenum disulfide and 0.83 parts of graphite per 1 part of titanium alkoxide, and this was applied to the box surface using a liquid mixture of xylene, methylene chloride, and isobutyl alcohol as a dispersant. Then, after sitting in the atmosphere for 6 hours, the composition of the film in a dry state was measured. The content expressed as a mass proportion was 2.5 parts of molybdenum disulfide and 1.5 parts of graphite per 1 part of an inorganic polymeric compound having a Ti—O backbone. The film thickness was 30 µm.

As shown in Table 6, when tightening and loosening were performed 19 times as shown in Table 4, there was no occurrence of galling, and the results were good. However, galling occurred when tightening was performed a 20th time. However, the amount of tightening and the tightening torque at the time of tightening were suitable.

(6) Test Number 6

The following surface treatment was performed on a threaded joint made of the Cr steel shown in Table 1. Number 120 sand was blown at the pin surface and the box surface, and both were given a surface roughness of 5 µm. Titanium alkoxide in which the alkyl group was ethyl was mixed with molybdenum disulfide powder having an average particle diameter of 1.0 µm with a mass ratio of 0.23 parts of molybdenum disulfide per 1 part of titanium alkoxide, and this was applied to both the pin surface and the box surface using a liquid mixture of xylene, methylene chloride, and butyl alcohol as a dispersant. Then, after sitting in the atmosphere for 4 hours, hot air at 150° C. was blown for 15 minutes. When the composition of the film in a dry state was measured, for both the pin and the box, the content in mass proportion was 0.35 parts of molybdenum disulfide with respect to 1 part of an inorganic polymeric compound having a Ti—O backbone. The film thickness was 20 µm.

As shown in Table 6, there was no occurrence of galling up to the 19th tightening and loosening in Table 4, and the results were good. However, light galling was observed after the 20th tightening. However, it was determined that further repeated use was possible if surface adjustment was performed. At the time of tightening, the amount of tightening and the tightening torque were suitable.

(7) Test Number 7

The following surface treatment was performed on a joint made of the carbon steel shown in Table 1. The box surface was finished by machine grinding to obtain a surface roughness of 2 µm. Number 180 grit was blown at the pin surface to obtain a surface roughness of 10 µm. Titanium alkoxide in which the alkyl group was isopropyl was mixed with molybdenum disulfide powder having an average particle diameter of 1.8 µm and graphite powder having an average particle diameter of 2.5 µm with a mass ratio of 3.05 parts of molybdenum disulfide and 1.94 parts of graphite per 1 part of titanium alkoxide. This was applied to the pin surface using a liquid mixture of methyl ethyl ketone, methylene chloride, and isobutyl alcohol as a dispersant. Then, after sitting in the atmosphere for 2 hours, hot air at 150° C. was blown for fifteen minutes. When the composition of the film in a dry state was measured, the content in mass proportion was 5.5 parts of molybdenum disulfide and 3.5 parts of graphite to 1 part of an inorganic polymeric compound having a Ti—O backbone. The film thickness was 20 µm.

As shown in Table 6, there was no occurrence of galling in the 20 tightenings and loosenings of Table 4, and the results were extremely good. The amount of tightening and the tightening torque at the time of tightening were both suitable.

(8) Test Number 8

The following surface treatment was performed on a joint made of the Cr steel shown in Table 1. #120 sand was blown at the pin surface and the box surface to give both a surface roughness of 4 µm. A titanium alkoxide in which the alkyl group was propyl was mixed with molybdenum disulfide powder having an average particle diameter of 1.2 µm and graphite powder having an average particle diameter of 1.5 µm in a mass proportion of 2.78 parts of molybdenum disulfide and 0.83 parts of graphite per 1 part of titanium alkoxide. This was applied to both the pin surface and the box surface using a liquid mixture of xylene, methylene chloride, and butyl alcohol as a dispersant. Then, after being left in the atmosphere for 3 hours, hot air at 140° C. was blown for 20 minutes. When the composition of the film in a dry state was measured, for both the pin and the box, the content in mass proportion was 5.0 parts of molybdenum disulfide and 1.5 parts of graphite for 1 part of an inorganic polymeric compound having a Ti—O backbone. The film thickness was 5 µm.

As shown in Table 6, there was no occurrence of galling when tightening and loosening were performed 20 times as in Table 4, and the results were extremely good. The amount of tightening and the tightening torque at the time of tightening were both suitable.

(9) Test Number 9

The following surface treatment was performed on a joint made of the high alloy steel shown in Table 1. The pin surface and the box surface were finished by machine grinding to give them a surface roughness of 2 μm. A titanium alkoxide in which the alkyl group was ethyl was mixed with molybdenum disulfide powder having an average particle diameter of 1.2 μm and graphite powder having an average particle diameter of 1.5 μm in a mass proportion of 1.33 parts of molybdenum disulfide and 1.0 parts of graphite per 1 part of titanium alkoxide. This was applied to the box surface using a liquid mixture of xylene, methylene chloride, and butyl alcohol as a dispersant. Then, after being left in the atmosphere for 6 hours, when the composition of the film in a dry state was measured, for both the pin and the box, the content in mass proportion was 2.0 parts of molybdenum disulfide and 1.5 parts of graphite for 1 part of an inorganic polymeric compound having a Ti—O backbone. The film thickness was 10 μm on the pin and 30 μm on the box.

As shown in Table 6, there was no occurrence of galling when tightening and loosening were performed 20 times as in Table 4, and the results were extremely good. The amount of tightening and the tightening torque at the time of tightening were both suitable.

(10) Test Number 10

The following surface treatment was performed on a joint made of the Cr steel shown in Table 1. #80 sand was blown at the pin surface and the box surface to give both a surface roughness of 10 μm. An epoxy resin and molybdenum disulfide powder having an average particle diameter of 1.8 μm were mixed in a mass proportion of 1 part of molybdenum disulfide to 1 part of the epoxy resin using a liquid mixture of toluene, isopropyl alcohol, and the like as a dispersant, and this was applied to both the pin surface and the box surface. Then, after drying, heat treatment was carried out at 180° C. for 30 minutes. When the composition of the film after heat treatment was measured, for both the pin and the box, the content in mass proportion was 1 part of molybdenum disulfide to 1 part of the epoxy resin. The film thickness was 20 μm.

As shown in Table 6, light galling was ascertained upon the 12th tightening, the amount of tightening was inadequate, and a prescribed surface pressure could not be applied to the shoulder portion. When the tightening torque was increased so as to perform tightening to a prescribed position, galling occurred on the 13th tightening.

(11) Test Number 11

The following surface treatment was performed on a joint made of the carbon steel shown in Table 1. The pin surface was subjected to finishing by machine grinding to give it a surface of 2 μm. A molten sodium nitride film having a thickness of 2 μm was formed on the surface of the box which had been finished to a surface roughness of 2 μm by machine grinding. A manganese phosphate film having a thickness of 15 μm was formed atop it. Then, a polyamide-imide resin and tungsten disulfide powder having an average particle diameter of 3.5 μm with a mass ratio of 1 part of molybdenum disulfide to 1 part of the polyamide-imide resin were mixed with a liquid mixture of xylene, toluene, and isopropyl alcohol as a dispersant, and this was applied atop the surface of the manganese phosphate film. Then, after drying, heat treatment at 180° C. for 30 minutes was performed. When the composition of the film after heat treatment was measured, the content in mass proportion was 1 part of molybdenum disulfide to 1 part of the polyamide-imide resin. The film thickness was 35 μm.

As shown in Table 6, no galling was observed on the 12th tightening, but the amount of tightening was inadequate, and a prescribed surface pressure was not applied to the shoulder portion. When the tightening torque was increased until tightening to a prescribed position took place, galling occurred on the 14th tightening.

(12) Test Number 12

The following surface treatment was performed on a joint made of the Cr steel shown in Table 1. The box surface was finished by machine grinding to give it a surface roughness of 2 μm. Number 80 sand was blown at the pin surface to give it a surface roughness of 10 μm, and then a manganese phosphate film having a thickness of 15 μm was formed on it. An epoxy resin and molybdenum disulfide powder having an average particle diameter of 1.8 μm with a mass proportion of 1 part of molybdenum disulfide per 1 part of the epoxy resin were mixed with a liquid mixture of toluene, isopropyl alcohol, and the like as a dispersant and applied atop this. Then, after drying, heat treatment at 180° C. for 30 minutes was performed. When the composition of the film was measured after the heat treatment, the content in mass proportion was 1 part of molybdenum disulfide per 1 part of the epoxy resin. The film thickness was 30 μm.

As shown in Table 6, galling was observed upon the 12th tightening, the amount of tightening was inadequate, and a prescribed surface pressure could not be applied to the shoulder portion.

(13) Test Number 13

The following surface treatment was performed on a joint made of the Cr steel shown in Table 1. The pin surface was finished by machine grinding to give it a surface roughness of 2 μm. Cu plating was performed to a thickness of 10 μm on the surface of the box which had been finished by machine grinding to a surface roughness of 2 μm. Then, a compound grease corresponding to API-Bu15A2 was applied to both the pin surface and the box surface in an amount of approximately 20 grams per unit area (1 dm²).

As shown in Table 6, light galling was observed upon the 12th tightening, the amount of tightening was inadequate, and a prescribed surface pressure could not be applied to the shoulder portion. When the tightening torque was increased so as to obtain tightening to a prescribed position, galling occurred on the 13th tightening.

(14) Test Number 14

The following surface treatment was performed on a joint made of the 1 s carbon steel shown in Table 1. The pin surface was finished by machine grinding to give it a surface roughness of 2 μm. Manganese phosphate treatment to a thickness of 15 μm was performed on the surface of a box at which number 80 sand had been blown to give it a surface roughness of 10 μm. Then, a compound grease corresponding to API-Bu15A2 was applied to both the pin surface and the box surface in an amount of approximately 20 grams per unit area (1 dm²).

As shown in Table 6, light galling occurred upon the 8th tightening, but surface adjustment was performed and the test was continued. However, galling was observed upon the 11th loosening, and galling became marked upon the 12th tightening, the amount of tightening was inadequate, and a prescribed surface pressure could not be applied to the shoulder portion.

In the above manner, a threaded joint on which a lubricating film according to the invention of an inorganic polymeric compound having a Ti—O backbone has an excellent galling resistance at high temperatures compared to a threaded joint having a resin film formed thereon or a threaded joint coated with a compound grease.

Example 2

A phosphate film was formed on the box surface and the pin surface of a threaded joint made of the carbon steel, the Cr—Mo steel, or the Cr steel having the composition shown in Table 7 (outer diameter: 7 inches, wall thickness: 0.408 inches), and a lubricating film of an inorganic polymeric compound having a Ti—O backbone was formed atop it. The formation of the lubricating film and surface treatment conditions such as pretreatment are shown in Tables 8 and 9. Test Numbers 10–12 in the table are ones in which a resin film was formed as a lubricating film, and Test Numbers 13 and 14 are ones in which a compound grease was applied.

TABLE 7

| No. | C | Si | Mn | P | S | Cu | Ni | Cr | Mo | Steel type |
|-----|------|------|------|------|------|------|------|------|------|-------------|
| A | 0.24 | 0.30 | 1.30 | 0.02 | 0.01 | 0.04 | 0.07 | 0.17 | 0.04 | Carbon steel |
| B | 0.25 | 0.25 | 0.80 | 0.02 | 0.01 | 0.04 | 0.05 | 0.95 | 0.18 | Cr—Mo steel |
| C | 0.14 | 0.30 | 1.00 | 0.02 | 0.01 | 0.04 | 0.15 | 5.0  | 0.04 | Cr steel |

(Notes)
Content is in mass %.
Remainder is Fe and unavoidable impurities.

TABLE 8

| Test | Pin | | Box | |
|------|-----|---|-----|---|
| No. | Pretreatment | Lubricating film | Pretreatment | Lubricating film |
| 1 | AsM (R = 3) | None | AsM (R = 3)<br>P-Zn (t = 5) | Ti-O (M = 1)<br>$MoS_2$ (M = 1)<br>graphite<br>(M = 1)<br>t = 40 |
| 2 | AsM (R = 2) | None | SB (R = 10)<br>P-Zn (t = 10) | Ti = O (M = 1)<br>$MoS_2$ (M = 3)<br>graphite (M = 2)<br>t = 10 |
| 3 | SB (R = 10)<br>P-Ca (t = 5) | Ti-O (M = 1)<br>$MoS_2$ (M = 5.5)<br>graphite<br>(M = 3.5)<br>t = 20 | AsM (R = 2) | None |
| 4 | SHB<br>(R = 15)<br>P-Mn<br>(t = 10) | Ti-O (M = 1)<br>$MoS_2$ (M = 5)<br>graphite<br>(M = 1.5)<br>t = 20 | AsM (R = 2) | None |
| 5 | SB (R = 3)<br>P-Mn (t = 5) | Ti-O (M = 1)<br>$MoS_2$ (M = 3)<br>t = 8 | SB (R = 3)<br>P-Mn (t = 5) | Ti-O (M = 1)<br>$MoS_2$ (M = 3)<br>t = 8 |
| 6 | AsM (R = 2) | None | AsM (R = 2)<br>P-Mn (t = 3) | Ti-O (M = 1)<br>$MoS_2$ (M = 2.5)<br>graphite<br>(M = 1.5)<br>t = 30 |
| 7 | SB (R = 5) | Ti-O (M = 1)<br>$MoS_2$ (M = 0.35)<br>t = 20 | SB (R = 5) | Ti-O (M = 1)<br>$MoS_2$ (M = 0.35)<br>t = 20 |
| 8 | SB (R = 4)<br>P-Zn (t = 5) | Ti-O (M = 1)<br>$MoS_2$ (M = 5)<br>graphite<br>(M = 1.5)<br>t = 10 | SB (R = 4)<br>P-Mn (t = 5) | Ti-O (M = 1)<br>$MoS_2$ (M = 5)<br>graphite<br>(M = 1.5)<br>t = 10 |
| 9 | AsM (R = 2) | Ti-O (M = 1)<br>$MoS_2$ (M = 2)<br>graphite<br>(M = 1.5)<br>t = 5 | SB (R = 5)<br>P-Mn (t = 5) | Ti-O (M = 1)<br>$MoS_2$ (M = 2)<br>graphite<br>(M = 1.5)<br>t = 5 |
| 10 | AsM (R = 3) | None | AsM (R = 3)<br>P-Zn (t = 10) | Ti-O (M = 1)<br>$MoS_2$ (M = 6)<br>graphite<br>(M = 3.5)<br>t = 20 |
| 11 | SB (R = 10)<br>P-Ca (t = 10) | Ti-O (M = 1)<br>$MoS_2$ (M = 0.25)<br>t = 25 | AsM (R = 2) | None |

(Notes)
AsM: grinding,
SB: sand blasting,
SHB: shot blasting
P-Ca: calcium phosphate,
P-Mn: manganese phosphate,
P-Zn: zinc phosphate,
Ti-O: inorganic polymeric compound with Ti-O backbone
R: surface roughness Rmax ($\mu$m),
t: film thickness ($\mu$m)
M: relative content when content of inorganic polymeric compound with Ti-O backbone is 1

TABLE 9

| Test | Pin | | Box | |
|------|-----|---|-----|---|
| No. | Pretreatment | Lubricating film | Pretreatment | Lubricating film |
| 12 | SB (R = 10) | epoxy resin<br>(M = 1)<br>$MoS_2$ (M = 1)<br>t = 20 | SB (R = 10) | epoxy resin<br>(M = 1)<br>$MoS_2$ (M = 1)<br>t = 20 |
| 13 | AsM (R = 2) | None | N (t = 2)<br>P-Mn<br>(t = 15) | polyamide-imide<br>resin<br>(M = 1)<br>$WS_2$ (M = 1)<br>t = 35 |

TABLE 9-continued

| Test No. | Pin Pretreatment | Pin Lubricating film | Box Pretreatment | Box Lubricating film |
|---|---|---|---|---|
| 14 | SB (R = 10) P-Mn (t = 15) | epoxy resin (M = 1) MoS$_2$ (M = 1) t = 30 | AsM (R = 2) | None |
| 15 | AsM (R = 2) | compound grease: (20 g/d m$^2$) | AsM (R = 2) | Cu-P (t = 10) compound grease: (20 g/d m$^2$) |
| 16 | AsM (R = 2) | compound grease: (20 g/d m$^2$) | SB (R = 10) | P-Mn (t = 15) compound grease: (20 g/d m$^2$) |

(Notes)
AsM: grinding,
SB: sand blasting
P-Mn: manganese phosphate,
Cu-P: Cu plating,
N: nitriding
R: surface roughness Rmax (μm),
t: film thickness (μm)
M: relative content when content of epoxy resin or polyamide-imide resin is 1

Next, using the threaded joint on which the above-described surface treatment was performed, repeated tightening and loosening operations were performed up to a maximum of 25 times under the conditions shown in Table 10, and the occurrence of galling was investigated.

TABLE 10

| | |
|---|---|
| 1st–10th time | tightening and loosening at room temperature |
| 11th time | heating for 24 hr at 400° C. after tightening at room temperature, followed by cooling to room temperature then loosening |
| 12th–15th time | tightening and loosening at room temperature |
| 16th time | heating for 24 hr at 400° C. after tightening at room temperature, followed by cooling to room temperature then loosening |
| 17th–20th time | tightening and loosening at room temperature |
| 21st time | heating for 24 hr at 400° C. after tightening at room temperature, followed by cooling to room temperature then loosening |
| 22nd–25th time | tightening and loosening at room temperature |

Namely, as shown in Table 10, tightening and loosening were performed 1st–10th times, 12th–15th times, 17th–20th times, and 22nd–25th times at room temperature. In addition, after performing tightening 11th time, 16th time, and 21st time at room temperature, heat treatment was performed at 400° C. for 24 hours, and then after cooling, loosening was performed at room temperature. The tightening speed and the tightening torque were the same as shown in Table 5 for Example 1.

Table 11 shows the occurrence of galling and the tightened state. Below, the surface of both the threaded portion and the metal contact portion of the pin will be referred to as the pin surface, and the surface of both the threaded portion and the metal contact portion of the box will be referred to as the box surface. The surface roughness is indicated by the value of Rmax.

TABLE 11

| Test No. | 10 | 11 | 12 | 13 | 14 | 15 | 16 | 17 | 18 | 19 | 20 | 21 | 22 | 23 | 24 | 25 | Tightened condition |
|---|---|---|---|---|---|---|---|---|---|---|---|---|---|---|---|---|---|
| 1 | ○ | ○ | ○ | ○ | ○ | ○ | ○ | ○ | ○ | ○ | ○ | X | — | — | — | — | Good |
| 2 | ○ | ○ | ○ | ○ | ○ | ○ | ○ | ○ | ○ | ○ | ○ | ○ | ○ | X | — | — | Good |
| 3 | ○ | ○ | ○ | ○ | ○ | ○ | ○ | ○ | ○ | ○ | ○ | ○ | ○ | ○ | ○ | ○ | Good |
| 4 | ○ | ○ | ○ | ○ | ○ | ○ | ○ | ○ | ○ | ○ | ○ | ○ | ○ | ○ | ○ | ○ | Good |
| 5 | ○ | ○ | ○ | ○ | ○ | ○ | ○ | ○ | ○ | ○ | ○ | ○ | ○ | ○ | ○ | ○ | Good |
| 6 | ○ | ○ | ○ | ○ | ○ | ○ | ○ | ○ | ○ | ○ | ○ | ○ | ○ | ○ | ○ | Δ | Good |
| 7 | ○ | ○ | ○ | ○ | ○ | ○ | ○ | ○ | ○ | ○ | ○ | ○ | ○ | ○ | ○ | ○ | Good |
| 8 | ○ | ○ | ○ | ○ | ○ | ○ | ○ | ○ | ○ | ○ | ○ | ○ | ○ | ○ | ○ | ○ | Good |
| 9 | ○ | ○ | ○ | ○ | ○ | ○ | ○ | ○ | ○ | ○ | ○ | ○ | ○ | ○ | ○ | ○ | Good |
| 10 | ○ | ○ | ○ | ○ | ○ | ○ | X | — | — | — | — | — | — | — | — | — | Good |
| 11 | ○ | ○ | ○ | ○ | ○ | ○ | ○ | X | — | — | — | — | — | — | — | — | Good |
| 12 | ○ | ○ | Δ | X | — | — | — | — | — | — | — | — | — | — | — | — | inadequate tightening on 12th time |
| 13 | ○ | ○ | ○ | ○ | ○ | X | — | — | — | — | — | — | — | — | — | — | inadequate tightening on 12th time |
| 14 | ○ | ○ | X | — | — | — | — | — | — | — | — | — | — | — | — | — | |
| 15 | ○ | ○ | Δ | X | — | — | — | — | — | — | — | — | — | — | — | — | inadequate tightening on 12th time |
| 16 | ○ | X | — | — | — | — | — | — | — | — | — | — | — | — | — | — | |

(Notes)
○: no occurrence of galling, Δ: light occurrence (surface adjustment possible)
X: much occurrence (surface adjustment not possible), —: not carried out (1) Test Number 1

The following surface treatment was performed on a threaded joint made of the carbon steel shown in Table 7. The pin surface had a surface roughness of 3 μm in an as-machined state. The box surface was finished by machine grinding to a surface roughness of 3 μm, and a zinc phosphate film having a thickness of 5 μm was formed on the box surface by chemical conversion treatment. Titanium alkoxide having methyl as an alkyl group was mixed with molybdenum disulfide powder having an average particle diameter of 1.5 μm and graphite powder having an average particle diameter of 3.5 μm with a mass proportion of 0.77 parts of molybdenum disulfide and 0.77 parts of graphite per 1 part of titanium alkoxide. This was applied using a liquid mixture of methylene chloride and butyl alcohol as a dispersant. After being left in the atmosphere for 6 hours, the composition of the film formed on the upper surface of the zinc phosphate film was measured in a dry state. The content expresses as a relative mass was 1 part of molybdenum sulfide and 1 part of graphite per 1 part of an inorganic polymeric compound having a Ti—O backbone was 1. The thickness of the film was 40 µm.

As shown in Table 11, there was no occurrence of galling up to the 20th tightening and loosening operation in Table 10. However, galling occurred on the 21 st loosening after heat treatment.

(2) Test Number 2

The following surface treatment was performed on a threaded joint made of the carbon steel shown in Table 7. The pin surface was finished by machine grinding to a surface roughness of 2 µm. Number 80 sand was blown at the box surface to give it a surface roughness of 10 µm, and a zinc phosphate film having a thickness of 10 µm was formed on the box surface by chemical conversion treatment. Titanium alkoxide in which the alkyl group was ethyl was mixed with molybdenum disulfide powder having an average particle diameter of 1.8 µm and graphite powder having an average particle diameter of 2.8 µm in a mass proportion of 2 parts of molybdenum disulfide and 1.33 parts of graphite with respect to 1 part of titanium alkoxide. This was applied on the top surface of the zinc phosphate film using a liquid mixture of xylene, methylene chloride, and butyl alcohol as a dispersant. Then, after being left in the atmosphere for 3 hours, hot air at 165° C. was blown for 30 minutes. When the composition of the film formed on the top surface of the zinc phosphate film was measured in a dry state, the content in mass proportion was 3 parts molybdenum disulfide and 2 parts of graphite with respect to 1 part of an inorganic polymeric compound having a Ti—O backbone. The film thickness was 10 µm.

As shown in Table 11, there was no occurrence of galling up to the 22nd tightening and loosening operation of Table 10, and the results were good. However, galling occurred upon the 23rd tightening. The amount of tightening and the tightening torque at the time of tightening were suitable.

(3) Test Number 3

The following surface treatment was performed on a threaded joint made of the Cr steel shown in Table 7. The box surface was finished by machine grinding to give it a surface roughness of 2 µm. Number 80 sand was blown at the pin surface to give it a surface roughness of 10 µm. A calcium phosphate film with a thickness of 5 µm was formed on the pin surface by chemical conversion treatment. Titanium alkoxide in which the alkyl group was isopropyl was mixed with molybdenum disulfide having an average particle diameter of 1.8 µm and graphite powder having an average particle diameter of 2.5 µm in a mass proportion of 3.06 parts of molybdenum disulfide and 1.94 parts of graphite per 1 part of titanium alkoxide, and this was applied on the top surface of the calcium phosphate film using a liquid mixture of methyl ethyl ketone, methylene chloride, and butyl alcohol as a dispersant. Then, after being left in the atmosphere for 2 hours, humidified hot air at 150° C. was blown for 15 minutes, and then dry air at 150° C. was blown. When the composition of the film formed on the top surface of the calcium phosphate film was measured in the dry state, in mass proportion, the content was 5.5 parts of molybdenum disulfide and 3.5 parts of graphite to 1 part of an inorganic polymeric compound having a Ti—O backbone. The film thickness was 20 µm.

As shown in Table 11, there was no occurrence of galling through the 25th tightening and loosening of Table 10, and the results were extremely good. The amount of tightening and the tightening torque at the time of tightening were both suitable.

(4) Test Number 4

The following surface treatment was performed on a threaded joint made of the carbon steel shown in Table 7. The box surface was finished by machine grinding to a surface roughness of 2 µm. Number 80 shot was blown at the pin surface to give it a surface roughness of 15 µm, and then a manganese phosphate film with a thickness of 10 µm was formed on the pin surface by chemical conversion treatment. Titanium alkoxide in which the alkyl group was propyl was mixed with molybdenum disulfide powder having an average particle diameter of 4.6 µm and graphite powder having an average particle diameter of 1.3 µm in a mass proportion of 2.78 parts of molybdenum disulfide and 0.83 parts of graphite per 1 part of titanium alkoxide, and this was applied on the top surface of the manganese phosphate film using a liquid mixture of methyl ethyl ketone, methylene chloride, and butyl alcohol as a dispersant. Then, after being left in the atmosphere for 3 hours, humidified hot air at 150° C. was blown for 10 minutes. When the composition of the film formed on the top surface of the manganese phosphate film was measured in a dry state, the content expressed as a mass proportion was 5.0 parts of molybdenum disulfide and 1.5 parts of graphite per 1 part of an inorganic polymeric compound having a Ti—O backbone. The film thickness was 20 µm.

As shown in Table 11, there was no occurrence of galling up to the 25th tightening and loosening of Table 10, and the results were extremely good. The amount of tightening and the tightening torque at the time of tightening were both suitable.

(5) Test Number 5

The following surface treatment was performed on a threaded joint made of the Cr—Mo steel shown in Table 7. Number 180 sand was blown at the pin surface and the box surface to give both a surface roughness of 3 µm. A manganese phosphate film having a thickness of 5 µm was formed on both surfaces by chemical conversion treatment. Titanium alkoxide in which the alkyl group was methyl and molybdenum disulfide powder with an average particle diameter of 1.2 µm were mixed with a mass proportion of 2.31 parts of molybdenum disulfide per 1 part of titanium alkoxide, and this was applied on the top surface of both using a liquid mixture of xylene, methylene chloride and butyl alcohol as a dispersant. After being left in the atmosphere for 2 hours, humidified hot air at 165° C. was blown for 30 minutes. When the composition of the films formed on the top surface of the manganese phosphate films was measured in a dry state, the content in mass proportion was 3.0 parts of molybdenum disulfide per 1 part of an inorganic polymeric compound having a Ti—O backbone. The film thickness was 8 µm on both the pin and the box.

As shown in Table 11, there was no occurrence of galling through the 25th tightening and loosening of Table 10, and the results were extremely good. The amount of tightening and the tightening torque at the time of tightening were both suitable.

(6) Test Number 6

The following surface treatment was performed on a threaded joint made of the Cr—Mo steel shown in Table 7. The pin surface was finished by machine grinding to a surface roughness of 2 µm. The box surface was finished by machine grinding to a surface roughness of 2 µm, and a manganese phosphate film with a thickness of 3 μm was formed on the box surface by chemical conversion treatment. Titanium alkoxide in which the alkyl group was isobutyl was mixed with molybdenum disulfide powder having an average particle diameter of 3.1 μm and graphite powder having an average particle diameter of 3.5 μm in a mass proportion of 1.39 parts of molybdenum disulfide and 0.83 parts of graphite to 1 part of titanium alkoxide, and this was applied on the top surface of the manganese phosphate film using a liquid mixture of xylene, methylene chloride and isobutyl alcohol as a dispersant. Then, after being left in the atmosphere for 6 hours, the composition of the film formed on the top surface of the manganese phosphate film was measured in a dry state. In mass proportion, the content was 2.5 parts of molybdenum disulfide and 1.5 parts of graphite per 1 part of an inorganic polymeric compound having a Ti—O backbone. The film thickness was 30 μm.

As shown in Table 11, there was no occurrence of galling up to the 24th tightening and loosening operation of Table 10, and the results were good. However, galling occurred upon the 25th tightening. The amount of tightening and the tightening torque at the time of tightening were both suitable.

(7) Test Number 7

The following surface treatment was performed on a threaded joint made of the Cr steel shown in Table 7. Number 120 sand was blown at the pin surface and the box surface, and both were given a surface roughness of 5 μm. A manganese phosphate film having a thickness of 5 μm was formed on both surfaces by chemical conversion treatment. Titanium alkoxide in which the alkyl group was ethyl was mixed with molybdenum disulfide powder having an average particle diameter of 1.0 μm in a mass proportion of 0.23 parts of molybdenum disulfide per 1 part of titanium alkoxide, and this was applied on the top surfaces of both using a liquid mixture of xylene, methylene chloride, and butyl alcohol as a dispersant. Then, after being left in the atmosphere for 4 hours, hot air at 150° C. was blown for 15 minutes. When the composition of the film formed on the top surface of the manganese phosphate film was measured in a dry state, in mass proportion, the content was 0.35 parts of molybdenum disulfide per 1 part of an inorganic polymeric compound having a Ti—O backbone. The film thickness was 20 μm on the pin and the box.

As shown in Table 11, there was no occurrence of galling through the 25th tightening and loosening of Table 10, and the results were extremely good. The amount of tightening and the tightening torque at the time of tightening were both suitable.

(8) Test Number 8

The following surface treatment was performed on a threaded joint made of the Cr—Mo steel shown in Table 7. Number 180 sand was blown at the pin surface and the box surface, and both were given a surface roughness of 4 μm. A zinc phosphate film having a thickness of 5 μm was formed on both surfaces by chemical conversion treatment. Titanium alkoxide in which the alkyl group was isopropyl was mixed with molybdenum disulfide powder having an average particle diameter of 1.2 μm and graphite powder having an average particle diameter of 1.5 μm in a mass proportion of 2.77 parts molybdenum disulfide and 0.83 parts of graphite to 1 part of titanium alkoxide, and this was applied on the top surface of both using a liquid mixture of xylene, methylene chlorine, and butyl alcohol as a dispersant. Then, after being left in the atmosphere for 3 hours, humidified hot air at 140° C. was blown for 20 minutes. When the composition of the films formed on the top surface of the zinc phosphate films was measured in a dry state, in mass proportion, the content was 5.0 parts of molybdenum disulfide and 1.5 parts of graphite per 1 part of an inorganic polymeric compound having a Ti—O backbone. The film thickness was 10 μm on the pin and the box.

As shown in Table 11, there was no occurrence of galling through the 25th tightening and loosening of Table 10, and the results were extremely good. The amount of tightening and the tightening torque at the time of tightening were both suitable.

(9) Test Number 9

The following surface treatment was performed on a threaded joint made of the carbon steel shown in Table 7. The pin surface was finished by machine grinding to give it a surface roughness of 2 μm. Number 180 sand was blown at the box surface to give it a surface roughness of 5 μm, and a manganese phosphate film having a thickness of 5 μm was formed on the box surface by chemical conversion treatment. Titanium alkoxide in which the alkyl group was ethyl was mixed with molybdenum disulfide powder having an average particle diameter of 1.2 μm and graphite powder having an average particle diameter of 1.5 μm in a mass proportion of 1.33 parts of molybdenum disulfide and 1.0 parts of graphite per 1 part of titanium alkoxide and was applied on the pin surface and the manganese phosphate film using a liquid mixture of xylene, methylene chloride, and butyl alcohol as a dispersant. Then, it was left in the atmosphere for 6 hours, and when the composition formed on the pin surface and the top surface of the zinc phosphate film was measured in a dry state, in mass proportion, the content of both was 2 parts of molybdenum disulfide and 1.5 parts of graphite per part of an inorganic polymeric compound having a Ti—O backbone. The film thickness was 5 μm.

As shown in Table 11, there was no galling through 25 tightenings and loosenings of Table 10, and the results were extremely good. In addition, the amount of tightening and the tightening torque at the time of tightening were both suitable.

(10) Test Number 10

The following surface treatment was performed on a threaded joint made of the Cr—Mo steel shown in Table 7. The pin surface had an as-machined surface roughness of 3 μm. The box surface was finished by machine grinding to give it a surface roughness of 3 μm. A zinc phosphate film having a thickness of 10 μm was formed on the box surface by chemical conversion treatment. Titanium alkoxide in which the alkyl group was ethyl was mixed with molybdenum disulfide powder having an average particle diameter of 3.5 μm and graphite powder having an average diameter of 3.1 μm in a mass proportion of 4.0 parts of molybdenum disulfide and 2.33 parts of graphite per 1 part of titanium alkoxide, and this was applied on the top surface of the zinc phosphate film using a liquid mixture of xylene, methylene chloride, and butyl alcohol as a dispersant. Then, after it was left 6 hours in the atmosphere, the composition of the film formed on the top surface of the zinc phosphate film was measured in a dry state. Expressed as a relative mass, the content was 6 parts of molybdenum disulfide and 3.5 parts of graphite per 1 part of an inorganic polymeric compound having a Ti—O backbone. The film thickness was 20 μm.

As shown in Table 11, there was no galling through the 15th tightening and loosening operation of Table 10, and the results were good. However, galling occurred on the 16th tightening. The amount of tightening and the tightening torque at the time of tightening were suitable.

(11) Test Number 11

The following surface treatment was performed on a threaded joint made of the carbon steel shown in Table 7. The box surface was finished by machine grinding to give it a surface roughness of 2 μm. Number 180 sand was blown at the pin surface to give a surface roughness of 10 μm, and a calcium phosphate film having a thickness of 10 μm was formed on the pin surface by chemical conversion treatment. Titanium alkoxide in which the alkyl group was propyl was mixed with molybdenum disulfide powder having an average particle diameter of 4.6 μm in a mass proportion of 0.14 parts of molybdenum disulfide per 1 part of titanium alkoxide, and this was applied on the top surface of the calcium phosphate film using a liquid mixture of methyl ethyl ketone, methylene chloride, and isobutyl alcohol as a dispersant. Next, after it was left for 3 hours in the atmosphere, humidified hot air at 150° C. was blown for 30 minutes. When the composition of the film formed on the top surface of the calcium phosphate film was measured in a dry state, in mass proportion, the content was 0.25 parts of molybdenum disulfide per 1 part of an inorganic polymeric compound having a Ti—O backbone. The film thickness was 25 μm.

As shown in Table 11, there was no occurrence of galling through the 16th tightening and loosening operation of Table 10, and the results were good. However, galling occurred on the 17th tightening. The amount of tightening and the tightening torque at the time of tightening were suitable.

(12) Test Number 12

The following surface treatment was performed on a threaded joint made of the Cr steel shown in Table 7. Number 80 sand was blown at the pin surface and the box surface to give each a surface roughness of 10 μm. An epoxy resin and molybdenum disulfide powder having an average particle diameter of 1.8 μm were mixed in a mass proportion of 1 part of molybdenum disulfide to 1 part of the epoxy resin, and this was applied on both surfaces using a liquid mixture of toluene, isopropyl alcohol, and the like as a dispersant. Next, after drying, heat treatment at 180° C. for 30 minutes was performed. When the composition of the film was measured after heat treatment, for both the pin and the box, the content in mass proportion was 1 part of molybdenum disulfide per 1 part of the epoxy resin. The film thickness was 20 μm.

As shown in Table 11, light galling was observed on the 12th tightening, the amount of tightening was inadequate, and a prescribed surface pressure could not be applied to the shoulder portion. When the tightening torque was increased so as to perform tightening to a prescribed position, galling occurred on the 13th tightening.

(13) Test Number 13

The following surface treatment was performed on a threaded joint made of the carbon steel shown in Table 7. The pin surface was finished by machine grinding to give it a surface roughness of 2 μm. The box surface was finished by machine grinding to give it a surface roughness of 2 μm, a molten salt nitride film having a thickness of 2 μm was formed on the box surface, and then a manganese phosphate film having a thickness of 15 μm was formed atop it. Then, a polyamide-imide resin and tungsten disulfide powder having an average particle diameter of 3.5 μm with a mass proportion of 1 part of tungsten disulfide per 1 part of polyamide-imide resin were mixed with a liquid mixture of xylene, toluene, and isopropyl alcohol as a dispersant, and this was applied to the top surface of the manganese phosphate film. Then, after drying, heat treatment at 180° C. for 30 minutes was carried out. When the composition of the film formed on the top surface of the manganese phosphate film was measured after heat treatment, the content in mass proportion was 1 part of tungsten disulfide to I part of polyamide-imide resin. The film thickness was 35 μm.

As shown in Table 11, galling was not observed through the 12th tightening, but the amount of tightening was inadequate, and a prescribed surface pressure could not be applied to a shoulder portion. When the tightening torque was increased to perform tightening to a prescribed position, galling occurred on the 14th tightening.

(14) Test Number 14

The following surface treatment was performed on a threaded joint made of the carbon steel shown in Table 7. The box surface was finished by machine grinding to give it a surface roughness of 2 μm. Number 80 sand was blown at the pin surface to give it a surface roughness of 10 μm, a manganese phosphate film having a thickness of 15 μm was formed on the pin surface, and atop this was applied a mixture of an epoxy resin and molybdenum disulfide powder having an average particle diameter of 1.8 μm with a mass proportion of 1 part of molybdenum disulfide per 1 part of epoxy resin, using a liquid mixture of toluene, isopropyl alcohol, and the like as a dispersant. Then, after drying, heat treatment was performed at 180° C. for 30 minutes. When the composition of the film formed atop the surface of the manganese phosphate film was measured after heat treatment, the content in mass proportion was 1 part molybdenum disulfide per 1 part of epoxy resin. The film thickness was 30 μm.

As shown in Table 11, galling was observed on the 12th tightening, the amount of tightening was inadequate, and a prescribed surface pressure could not be applied to the shoulder portion.

(15) Test Number 15

The following surface treatment was performed on a threaded joint made of the Cr steel shown in Table 7. The pin surface was finished by machine grinding to give it a surface roughness of 2 μm. Cu plating treatment was carried out to a thickness of 10 μm on the box surface which had been finished by machine grinding to a surface roughness of 2 μm. Then, a compound grease corresponding to API-Bu15A2 was applied to the pin surface and the box surface in an amount of approximately 20 grams per unit area (1 dm$^2$).

As shown in Table 11, light galling was observed on the 12th tightening, the amount of tightening was inadequate, and a prescribed surface pressure could not be applied to the shoulder portion. When the tightening torque was increased so as to tighten to a prescribed position, galling occurred on the 13th tightening.

(16) Test Number 16

The following surface treatment was performed on a joint made of the carbon steel shown in Table 7. The pin surface was finished by machine grinding to give it a surface roughness of 2 μm. Chemical conversion treatment was performed on the box surface which had been given a surface roughness of 10 μm by blowing number 80 sand to form a manganese phosphate film having a thickness of 15 μm. Then, a compound grease corresponding to API-Bu15A2 was applied to the pin surface and the top surface of the manganese phosphate film in an amount of approximately 20 grams per unit area (1 dm$^2$).

As shown in Table 11, light galling occurred on the 8th tightening, but surface adjustment was performed, and the test was continued. However, galling was observed on the 11th tightening, and galling became marked on the 1 2th tightening, the amount of tightening was inadequate, and a prescribed surface pressure could not be applied to the shoulder portion.

39

In the above manner, a threaded joint on which a lubricating film of an inorganic polymeric compound having a Ti—O backbone is formed atop a phosphate film has superior galling resistance during high temperature operation compared to a threaded joint in which a resin film is formed as a lubricating film or a threaded joint using a compound grease.

Example 3

Pretreatment such as Cu plating was carried out on the box surface and the pin surface of a threaded joint (outer diameter: 7 inches, wall thickness: 0.408 inches) made of the carbon steel, the Cr steel, or the high alloy steel having the same composition as in Table 1 of Example 1. In addition, a lubricating film was formed of an inorganic polymeric compound having a Ti—O backbone or of a resin was formed. Tables 12 and 13 show the formation of the lubricating film and surface treatment conditions including pretreatment conditions. Test Numbers 13 and 14 in these tables are threaded joints on which a resin lubricating film was formed without performing Cu plating treatment, and Test Numbers 15 and 16 are ones on which a compound grease was applied. The surface roughness shown in the table is the surface roughness of a substrate at the time of forming a lubricating film. Accordingly, in the case of the Cu plating treatment material, the surface roughness indicates the surface roughness of the Cu plated layer.

TABLE 12

| Test No. | Pin Pretreatment | Pin Lubricating film | Box Pretreatment | Box Lubricating film |
|---|---|---|---|---|
| 1 | AsM (R = 3) | None | AsM (R = 3) Cu-P (t = 7) | phenolic resin (M = 1) MoS$_2$ (M = 1) graphite (M = 1) t = 40 |
| 2 | AsM (R= 2) Cu-P (t = 10) | None | SB (R = 10) | Si-O (M = 1) MoS$_2$ (M = 3) graphite (M = 2) t = 10 |
| 3 | SHB (R = 15) Cu-P (t = 10) | Ti-O (M = 1) MoS$_2$ (M = 5) graphite (M = 1.5) t = 20 | AsM (R = 2) | None |
| 4 | Cu-P (t = 5) SB (R = 3) | polyimide resin (M = 1) MoS$_2$ (M = 3) t = 25 | Cu-P (t = 5) SB (R = 3) | polyimide resin (M = 1) MoS$_2$ (M = 3) t = 25 |
| 5 | AsM (R = 2) Cu-P (t = 10) | None | AsM (R = 2) | epoxy resin (M = 1) MoS$_2$ (M = 2.5) graphite (M = 1) t = 30 |
| 6 | SB (R = 5) Cu-P (t = 10) | Ti-O (M = 1) MoS$_2$ (M = 0.35) t = 10 | SB (R = 5) Cu-P (t = 10) | polyamide-imide resin (M = 1) MoS$_2$ (M = 0.35) t = 20 |
| 7 | SB (R = 10) | Ti-O (M = 1) MoS$_2$ (M = 5.5) graphite (M = 3.5) t = 15 | AsM (R = 2) Cu-P (t = 10) | None |
| 8 | SB (R = 4) Cu-P (t = 4) | Ti-O (M = 1) MoS$_2$ (M = 4) graphite (M = 1) t = 5 | SB (R = 4) Cu-P (t = 4) | Ti-O (M = 1) MoS$_2$ (M = 4) graphite (M = 1) t = 5 |

TABLE 12-continued

| Test No. | Pin Pretreatment | Pin Lubricating film | Box Pretreatment | Box Lubricating film |
|---|---|---|---|---|
| 9 | Cu-P (t = 15) SB (R = 10) | polyether sulfone (M = 1) MoS$_2$ (M = 2) graphite (M = 1) t = 25 | AsM (R = 2) | None |
| 10 | AsM (R = 1) | None | AsM (R = 3) Cu-P (t = 10) | epoxy resin (M = 1) MoS$_2$ (M = 6) graphite (M = 3.5) t = 20 |
| 11 | SB (R = 10) | Ti-O (M = 1) MoS$_2$ (M = 0.25) t = 25 | AsM (R = 2) Cu-P (t = 10) | None |

(Notes)
AsM: grinding,
SB: sand blasting,
SHB: shot blasting,
Cu-P: copper plating
Ti-O: inorganic polymeric compound with Ti-O backbone
Si-O: inorganic polymeric compound with Si-O backbone
R: surface roughness Rmax ($\mu$m),
t: film thickness ($\mu$m)
M: relative content when content of inorganic polymeric compound with M-O backbone or resin is 1

TABLE 13

| Test No. | Pin Pretreatment | Pin Lubricating film | Box Pretreatment | Box Lubricating film |
|---|---|---|---|---|
| 12 | SB (R = 10) | epoxy resin (M = 1) MoS$_2$ (M = 1) t = 20 | SB (R = 10) | epoxy resin (M = 1) MoS$_2$ (M = 1) t = 20 |
| 13 | SB (R = 10) P-Mn (t = 15) | epoxy resin (M = 1) MoS$_2$ (M = 1) t = 30 | AsM (R = 2) | None |
| 14 | AsM (R = 2) | compound grease: (20 g/d m$^2$) | AsM (R = 2) | Cu-P (t = 10) compound grease: (20 g/d m$^2$) |
| 15 | AsM (R = 2) | compound grease: (20 g/d m$^2$) | SB (R = 10) P-Mn (t = 15) | compound grease: (20 g/d m$^2$) |

(Notes):
AsM: grinding,
SB: sand blasting,
Cu-P: Cu plating
R: surface roughness Rmax ($\mu$m),
t: film thickness ($\mu$m)
M: relative content when content of epoxy resin or polyamide-imide resin is 1

Next, using threaded joints on which the above-described surface treatment was performed, in the same manner as in Example 3, tightening and loosening operations were repeated a maximum of 25 times under the conditions summarized in Table 10, and the conditions under which galling occurred were investigated. The tightening speed and the tightening torque were the same as in Table 5 of Example 1.

Table 14 shows the occurrence of galling and the tightened condition.

TABLE 14

| Test No. | 8 | 9 | 10 | 11 | 12 | 13 | 14 | 15 | 16 | 17 | 18 | 19 | 20 | 21 | 22 | 23 | 24 | 25 | Tightened condition |
|---|---|---|---|---|---|---|---|---|---|---|---|---|---|---|---|---|---|---|---|
| 1 | ○ | ○ | ○ | ○ | ○ | ○ | ○ | ○ | ○ | ○ | ○ | ○ | ○ | X | — | — | — | — | Good |
| 2 | ○ | ○ | ○ | ○ | ○ | ○ | ○ | ○ | ○ | ○ | ○ | ○ | ○ | X | — | — | — | — | Good |
| 3 | ○ | ○ | ○ | ○ | ○ | ○ | ○ | ○ | ○ | ○ | ○ | ○ | ○ | ○ | ○ | ○ | ○ | Δ | Good |
| 4 | ○ | ○ | ○ | ○ | ○ | ○ | ○ | ○ | ○ | ○ | ○ | ○ | ○ | ○ | ○ | ○ | ○ | ○ | Good |
| 5 | ○ | ○ | ○ | ○ | ○ | ○ | ○ | ○ | ○ | ○ | ○ | ○ | ○ | ○ | Δ | — | — | — | Good |
| 6 | ○ | ○ | ○ | ○ | ○ | ○ | ○ | ○ | ○ | ○ | ○ | ○ | ○ | ○ | ○ | ○ | ○ | Δ | Good |
| 7 | ○ | ○ | ○ | ○ | ○ | ○ | ○ | ○ | ○ | ○ | ○ | ○ | ○ | ○ | ○ | ○ | ○ | Δ | Good |
| 8 | ○ | ○ | ○ | ○ | ○ | ○ | ○ | ○ | ○ | ○ | ○ | ○ | ○ | ○ | ○ | ○ | ○ | ○ | Good |
| 9 | ○ | ○ | ○ | ○ | ○ | ○ | ○ | ○ | ○ | ○ | ○ | ○ | ○ | ○ | ○ | ○ | ○ | Δ | Good |
| 10 | ○ | ○ | ○ | ○ | ○ | ○ | ○ | ○ | ○ | X | — | — | — | — | — | — | — | — | Good |
| 11 | ○ | ○ | ○ | ○ | ○ | ○ | ○ | ○ | ○ | X | — | — | — | — | — | — | — | — | Good |
| 12 | ○ | ○ | ○ | ○ | Δ | X | — | — | — | — | — | — | — | — | — | — | — | — | inadequate tightening on 12th time |
| 13 | ○ | ○ | ○ | ○ | X | — | — | — | — | — | — | — | — | — | — | — | — | — | |
| 14 | ○ | ○ | ○ | ○ | Δ | X | — | — | — | — | — | — | — | — | — | — | — | — | inadequate tightening on 12th time |
| 15 | Δ | Δ | Δ | X | X | — | — | — | — | — | — | — | — | — | — | — | — | — | |

(Notes)
○: no occurrence of galling, Δ: light occurrence (surface adjustment possible)
X: much occurrence (surface adjustment not possible), —: not carried out (1) Test Number 1

The following surface treatment was performed on a threaded joint made of the carbon steel shown in Table 1. The pin surface had an as-machined surface roughness of 3 μm. The box surface was finished by machine grinding to give it a surface roughness of 3 μm, and a Cu plating layer having a thickness of 7 μm was formed on the box surface by electrolytic plating. On the top surface of this was applied a mixture of a phenolic resin having an average molecular weight of 2000, molybdenum disulfide powder having an average particle diameter of 1.5 μm, and graphite powder having an average particle diameter of 3.5 μm with a mass proportion of 1 part of molybdenum disulfide and 1 part of graphite per 1 part of the phenolic resin, using a liquid mixture of toluene and isopropyl alcohol as a dispersant. When the composition of the lubricating film formed on the top surface of the Cu plating layer was measured in a dry state, the content expressed as a relative mass was 1 part of molybdenum disulfide and 1 part of graphite to 1 part of the phenolic resin. The film thickness was 40 μm.

As shown in Table 14, there was no galling through the 20th tightening and loosening operation of Table 10, and the results were good. However, galling occurred on the 21st tightening.

(2) Test Number 2

The following surface treatment was performed on a threaded joint made of the carbon steel shown in Table 1. The pin surface was finished by machine grinding to give it a surface roughness of 2 μm, and a Cu plating layer having a thickness of 10 μm was formed on the pin surface by electrolytic plating. Number 80 sand was blown at the box surface to give it a surface roughness of 10 μm. A silicon alkoxide in which the alkyl group was ethyl was mixed with molybdenum disulfide powder having an average particle diameter of 1.8 μm and graphite powder having an average particle diameter of 2.8 μm in a mass proportion of 2 parts of molybdenum disulfide and 1.33 parts of graphite per 1 part of silicon alkoxide, and this was applied to the box surface using a liquid mixture of xylene, methylene chloride, and butyl alcohol as a dispersant. After this was left in the atmosphere for 3 hours, hot air at 165° C. was blown for 30 minutes. When the composition of the lubricating film formed on the box surface was measured in a dry state, the content in mass proportion was 3 parts of molybdenum disulfide and 2 parts of graphite per 1 part of an inorganic polymeric compound having an Si—O backbone. The film thickness was 10 μm.

As shown in Table 14, there was no occurrence of galling through the 20th tightening and loosening operation of Table 10, and the results were good. However, galling occurred on the 21st tightening.

(3) Test Number 3

The following surface treatment was performed on a threaded joint made of the Cr steel shown in Table 1. The box surface was finished by machine grinding to give it a surface roughness of 2 μm. Number 80 shot was blown at the pin surface to give it a surface roughness of 15 μm, and a Cu plating layer having a thickness of 10 μm was formed on the pin surface by electrolytic plating. A titanium alkoxide in which the alkyl group was propyl was mixed with molybdenum disulfide powder having an average particle diameter of 2.6 μm and graphite powder having an average particle diameter of 1.3 μm in a mass proportion of 3.06 parts of molybdenum disulfide and 0.83 parts of graphite per 1 part of titanium alkoxide, and this was applied on the top surface of the Cu plating layer using a liquid mixture of methyl ethyl ketone, methylene chloride, and butyl alcohol as a dispersant. Then, after being left in the atmosphere for 3 hours, humidified hot air at 150° C. was blown for 10 minutes. When the composition of the lubricating film formed on the top surface of the Cu plating layer was measured in a dry state, the content in mass proportion was 5 parts of molybdenum disulfide and 1.5 parts of graphite per 1 part of an inorganic polymeric compound having a Ti—O backbone. The film thickness was 20 μm.

As shown in Table 14, there was no occurrence of galling through the 24th tightening and loosening operation of Table 10, and the results were good. However, light galling occurred on the 25th tightening. The amount of tightening and the tightening torque at the time of tightening were suitable.

(4) Test Number 4

The following surface treatment was performed on a threaded joint made of the high alloy steel shown in Table 1. The pin surface and the box surface were finished by machine grinding to a surface roughness of 2 μm. Then, a Cu plating layer having a thickness of 5 μm was formed on both by electrolytic plating. Then, Number 240 sand was blown at both surfaces to give both a surface roughness of 3 μm. Then, a polyimide resin having an average molecular weight of 18,000 was mixed with molybdenum disulfide powder having an average particle diameter of 1.2 μm in a mass proportion of 3 parts of molybdenum disulfide per 1 part of the polyimide resin, and this was applied to the surface of both using a liquid mixture of xylene, methylene chloride, and butyl alcohol as a dispersant. When the composition of the lubricating film formed on the top surface of the Cu plating layer was measured in a dry state, the content in mass proportion was 3 parts of molybdenum disulfide per 1 part of polyimide resin. The film thickness on the pin and the box was 25 μm.

As shown in Table 14, there was no occurrence of galling through the 25th tightening and loosening of Table 10, and the results were extremely good. The amount of tightening and the tightening torque at the time of tightening were both suitable.

(5) Test Number 5

The following surface treatment was performed on a threaded joint made of the carbon steel shown in Table 1. The pin surface was machined to a surface roughness of 2 μm, and a Cu plating layer having a thickness of 10 μm was formed on the pin surface by electrolytic plating. The box surface was finished by machine grinding to give it a surface roughness of 2 μm. An epoxy resin having an average molecular weight of 15,000 was mixed with molybdenum disulfide powder having an average particle diameter of 3.1 μm and graphite powder having an average particle diameter of 3.5 μm in a mass proportion of 2.5 parts of molybdenum disulfide and 1.5 parts of graphite per 1 part of the epoxy resin, and this was applied to the box surface using a liquid mixture of xylene, acetone, and butyl alcohol as a dispersant. When the composition of the lubricating film formed on the box surface was measured in a dry state, the content expressed as a relative mass was 2.5 parts of molybdenum disulfide and 1.5 parts of graphite per 1 part of the epoxy resin. The film thickness was 30 μm.

As shown in Table 14, there was no occurrence of galling through the 21st tightening and loosening operation of Table 10, and the results were good. However, light galling occurred on the 22nd tightening. The amount of tightening and the tightening torque at the time of tightening were both suitable.

(6) Test Number 6

The following surface treatment was performed on a threaded joint made of the Cr steel shown in Table 1. Number 120 sand was blown at the pin surface and the box surface to give each a surface roughness of 5 μm. A Cu plating layer having a thickness of 10 μm was formed on the surface of both by electrolytic plating. A titanium alkoxide in which the alkyl group was ethyl was mixed with molybdenum disulfide powder having an average particle diameter of 1.0 μm in a mass proportion of 0.23 parts of molybdenum disulfide per 1 part of titanium alkoxide, and this was applied to the top surface of the Cu plating layer on the pin using a liquid mixture of xylene, methylene chloride, and butyl alcohol as a dispersant. Then, after being left in the atmosphere for 4 hours, humidified hot air at 150° C. was blown for 20 minutes. A polyamide-imide resin having an average molecular weight of 15,000 was mixed with molybdenum disulfide powder having an average particle diameter of 1.0 μm in a mass proportion of 0.35 parts of molybdenum disulfide per 1 part of the polyamide-imide resin, and this was applied on the top surface of the Cu plating layer on the box using a liquid mixture of toluene and methyl ethyl ketone as a dispersant. When the composition of the lubricating films formed on the top surface of the Cu plating layers was measured in a dry state, the content on the pin in mass proportion was 0.35 parts of molybdenum disulfide with respect to 1 part of an inorganic polymeric compound having a Ti—O backbone and a film thickness worth 10 μm. The content on the box in mass proportion was 0.35 parts of molybdenum disulfide per 1 part of the polyamide-imide resin, and the film thickness was 20 μm.

As shown in Table 14, there was no occurrence of galling through the 24th tightening and loosening operation of Table 10, and the results were good. However, galling occurred on the 25th tightening. The amount of tightening and the tightening torque at the time of tightening were suitable.

(7) Test Number 7

The following surface treatment was performed on a threaded joint made of the carbon steel shown in Table 1. The box surface was finished by machine grinding to a surface roughness of 2 μm, and a Cu plating layer having a thickness of 10 μm was formed on the box surface by electrolytic plating. Number 80 sand was blown at the pin surface to give it a surface roughness of 10 μm. A titanium alkoxide in which the alkyl group was isopropyl was mixed with molybdenum disulfide powder having an average particle diameter of 1.8 μm and graphite powder having an average particle diameter of 2.5 μm in a mass proportion of 3.06 parts of molybdenum disulfide and 1.94 parts of graphite per I part of titanium alkoxide, and this was applied on the pin surface using a liquid mixture of methyl ethyl ketone, methylene chloride, and isopropyl alcohol as a dispersant. Then, after being left in the atmosphere for two hours, humidified hot air at 150° C. was blown for 15 minutes, and then hot air at 100° C. was blown for 5 minutes. When the composition of the lubricating film formed on the pin surface was measured in a dry state, the content in mass proportion was 5.5 parts of molybdenum disulfide and 3.5 parts of graphite per 1 part of an inorganic polymeric compound having a Ti—O backbone. The film thickness was 15 μm.

As shown in Table 14, there was no occurrence of galling through the 24th tightening and loosening operation of Table 10, and the results were good. However, light galling occurred upon the 25th tightening. The amount of tightening and the tightening torque at the time of tightening were suitable.

(8) Test Number 8

The following surface treatment was performed on the threaded joint made of the Cr steel shown in Table 1. Number 180 sand was blown at the pin surface and the box surface to give both a surface roughness of 4 μm. A Cu plating layer having a thickness of 10 μm was formed on the surface of both by electrolytic plating. A titanium alkoxide in which the alkyl group was propyl was mixed with molybdenum disulfide powder having an average particle diameter of 1.2 μm and graphite having an average particle diameter of 1.5 μm in a mass proportion of 2.22 parts of molybdenum disulfide and 0.56 parts of graphite per 1 part of titanium alkoxide, and this was applied one the top surface of the Cu plating layer of both using a liquid mixture of xylene, methylene chloride, and butyl alcohol as a dispersant. Then, after being left in the atmosphere for 3 hours, humidified hot air at 140° C. was blown for 20 minutes. When the composition of the lubricating film formed on the top surface of the Cu plating layer was measured in a dry state, the content in mass proportion on the pin and the box was both 4 parts of molybdenum disulfide and 1 part of graphite per 1 part of an inorganic polymeric compound having a Ti—O backbone. The film thickness was 5 μm.

As shown in Table 14, there was no occurrence of galling through the 25th tightening and loosening of Table 10, and the results were extremely good. The amount of tightening and the tightening torque at the time of tightening were both suitable.

(9) Test Number 9

The following surface treatment was performed on a threaded joint made of the high alloy steel shown in Table 1. The box surface was finished by machine grinding to give it a surface roughness of 2 μm. The pin surface was finished by machine grinding to give it a surface roughness of 2 μm, after which a Cu plating layer having a thickness of 15 μm was formed by electrolytic plating, and then Number 180 sand was blown at the surface of the Cu plating layer to give it a surface roughness of 10 μm. A polyethersulfone resin having a molecular weight of 5,000–15,000 was mixed with molybdenum disulfide power having an average particle diameter of 1.2 μm and graphite having an average particle diameter of 1.5 μm in a mass proportion of 2 parts of molybdenum disulfide and 1 part of graphite per 1 part of the polyethersulfone resin, and this was applied on the surface of the Cu plating layer using a liquid mixture of xylene, toluene, and methyl ethyl ketone as a dispersant. When the composition of the lubricating film formed on the top surface of the Cu plating layer was measured in a dry state, the content in mass proportion was 2 parts of molybdenum disulfide and 1 part of graphite per 1 part of polyethersulfone resin. The film thickness was 25 μm.

As shown in Table 14, there was no occurrence of galling through the 24th tightening and loosening operation of Table 10, and the results were good. However, light galling occurred on the 25th tightening. The amount of tightening and the tightening torque at the time of tightening were suitable.

(10) Test Number 10

The following surface treatment was performed on a threaded joint made of the Cr steel shown in Table 1. The pin surface had an as-machined surface roughness of 3 μm. The box surface was finished by machine grinding to give it a surface roughness of 3 μm, and then a Cu plating layer having a thickness of 10 μm was formed on the box surface by electrolytic plating. An epoxy resin having an average molecular weight of 15,000 was mixed with molybdenum disulfide powder having an average particle diameter of 3.1 μm and graphite powder having an average particle diameter of 3.5 μm in a mass proportion of 6 parts of molybdenum disulfide and 3.5 parts of graphite per 1 part of epoxy resin, and this was applied on the top surface of the Cu plating layer using a liquid mixture of xylene, acetone, and butyl alcohol as a dispersant. When the composition of the lubricating film formed on the top surface of the Cu plating layer was measured in a dry state, the content expressed as a relative mass was 6 parts of molybdenum disulfide and 3.5 parts of graphite per 1 part of epoxy resin. The film thickness was 20 μm.

As shown in Table 14, there was no occurrence of galling through the 16th tightening and loosening operation of Table 10, and the results were good. However, galling occurred on the 17th tightening.

(11) Test Number 11

The following surface treatment was performed on a threaded joint made of the carbon steel shown in Table 1. The box surface was finished by machine grinding to a surface roughness of 2 μm, and a Cu plating layer having a thickness of 10 μm was formed on the box surface by electrolytic plating. Number 180 sand was blown at the pin surface to give it a surface roughness of 10 μm. A titanium alkoxide in which the alkyl group was isopropyl was mixed with molybdenum disulfide powder having an average particle diameter of 4.6 μm in a mass proportion of 0.14 parts of molybdenum disulfide per 1 part of titanium alkoxide, and this was applied to the pin surface using a liquid mixture of methyl ethyl ketone, methylene chloride, and isobutyl alcohol as a dispersant. Then, after being left in the atmosphere for 3 hours, hot air at 150° C. was blown for 30 minutes. When the composition of the lubricating film formed on the surface of the Cu plating layer was measured in a dry state, the content in mass proportion was 0.25 parts of molybdenum disulfide per 1 part of an inorganic polymeric compound having a Ti—O backbone. The film thickness was 25 μm.

As shown in Table 14, there was no occurrence of galling through the 16th tightening and loosening operation of Table 10, and the results were good. However, galling occurred on the 17th tightening.

(12) Test Number 12

The following surface treatment was performed on a threaded joint made of the Cr steel shown in Table 1. Number 80 sand was blown at the pin surface and the box surface to give each a surface roughness of 10 μm. An epoxy resin with an average molecular weight of 10,000 was mixed with molybdenum disulfide powder having an average particle diameter of 1.8 μm in a mass proportion of 1 part of molybdenum disulfide per 1 part of the epoxy resin, and this was applied to the surfaces of both members using a liquid mixture of toluene and isopropyl alcohol as a dispersant. Then, after drying, heat treatment was carried out at 180° C. for 30 minutes. When the composition of the lubricating film formed on the pin surface and the box surface was measured after heat treatment, the content in mass proportion for both the pin and the box was 1 part of molybdenum disulfide per 1 part of the epoxy resin. The film thickness was 20 μm.

As shown in Table 14, there was no occurrence of galling through the 11th tightening and loosening operation of Table 10, and the results were good. However, galling occurred on the 12th tightening.

(13) Test Number 13

The following surface treatment was performed on a threaded joint made of the carbon steel shown in Table 1. The box surface was finished by machine grinding to give it a surface roughness of 2 μm. Number 80 sand was blown at the pin surface to give it a surface roughness of 10 μm, and then a manganese phosphate film having a thickness of 15 μm was formed on the pin surface. Atop this was applied a mixture of epoxy resin and molybdenum disulfide powder having an average particle diameter of 1.8 μm in a mass proportion of 1 part of molybdenum disulfide per 1 part of the epoxy resin using a liquid mixture of toluene, isopropyl alcohol, and the like as a dispersant. Then, after drying, heat treatment at 180° C. was carried out for 30 minutes. When the composition of the film formed on the top surface of the manganese phosphate film was measured after heat treatment, the content in mass proportion was 1 part of molybdenum disulfide per 1 part of the epoxy resin. The film thickness was 30 μm.

As shown in Table 14, galling was observed on the 12th tightening, the amount of tightening was inadequate, and a prescribed surface pressure could not be applied to the shoulder portion.

(14) Test Number 14

The following surface treatment was performed on a threaded joint made of the Cr steel shown in Table 1. The pin surface was finished by machine grinding to give it a surface roughness of 2 μm. Cu plating treatment to a thickness of 10 μm was performed on the box surface, which had been finished by machine grinding to give it a surface roughness of 2 μm. Then, a compound grease corresponding to API-Bu15A2 was applied to both the pin surface and the box surface in an amount of approximately 20 grams per unit area (1 dm$^2$).

As shown in Table 14, light galling was observed on the 12th tightening, the amount of tightening was inadequate, and a prescribed surface pressure could not be applied to the shoulder portion. When the tightening torque was increased so as to tighten to a prescribed position, galling took place on the 12th tightening.

(15) Test number 15

The following surface treatment was performed on a threaded joint made of the carbon steel shown in Table 1. The pin surface was finished by machine grinding to a surface roughness of 2 μm. A manganese phosphate film having a thickness of 15 μm was formed by chemical conversion treatment on the box surface at which Number 80 sand had been blown to give it a surface roughness of 10 μm. Then, a compound grease corresponding to API-Bu15A2 was applied to the pin surface and the top surface of the manganese phosphate film in an amount of approximately 20 grams per unit area (1 dm$^2$).

As shown in FIG. 14, light galling occurred on the 8th tightening, but surface adjustment was performed and the test was continued. However, galling was observed upon the 11th loosening, and galling became marked upon the 12th tightening. In addition, the amount of tightening was inadequate, and a prescribed surface pressure could not be applied to the shoulder portion.

In the above manner, it was learned that a threaded joint having a lubricating film of a resin or of an inorganic polymeric compound having a Ti—O backbone formed atop a Cu plating film and a threaded joint having a Cu plating film formed on one and on the other having a lubricating layer of a resin or of an inorganic polymeric compound having a Ti—O backbone has superior galling resistance at high temperatures compared to the threaded joints of Test Numbers 12–15. In particular, Test Numbers 1–9 in which the mass ratio (B/A) of the content (A) of a resin or an inorganic polymeric compound and the total content (B) of molybdenum disulfide and graphite was in the range of 0.3–9.0 exhibited even more superior galling resistance.

Example 4

Surface treatment was performed such as various pretreatments, formation of a lubricating film, and formation of a rust preventing film on the pin surface and the box surface of a threaded joint (outer diameter: 7 inches, wall thickness: 0.408 inches) made of the carbon steel and the Cr—Mo steel having the composition shown in Table 7 of Example 2.

Tables 15 and 16 show the composition and the form of the rust preventing oil composition used to form the rust preventing film, Table 17 shows the composition and form of the rust preventing oil, and Table 18 shows the details of surface treatment conditions.

TABLE 15

| metal salt of a carboxylic acid | A | Ca stearate (saponification number: 185 mgKOH/g, total base number: 50 mgKOH/g) |
| | B | Ba oleate (saponification number: 165 mgKOH/g, total base number: 30 mgKOH/g) |
| | C | Li palmitate (saponification number: 220 mgKOH/g, total base number: 40 mgKOH/g) |
| wax | A | cetyl palmitate (saponification number: 120 mgKOH/g) |
| | B | paraffin wax (molecular weight: 300) |
| | C | lanolin (saponification number: 100 mgKOH/g) |
| mineral oil | A | refined mineral oil (viscosity at 40° C.: 10 cSt) |
| | B | α olefin (viscosity at 40° C.: 22 cSt) |
| sulfonate | A | Ca dinonyl naphthalene sulfonate (overall base number: 300 mgKOH/g) |
| | B | petroleum of Ba sulfonate (total base number: 70 mgKOH/g) |
| lubricant | A | molybdenum disulfide (average particle diameter 2.8 μm) |
| | B | graphite (average particle diameter 0.5 μm) |
| | C | Mo dimethyl thio phosphate |

TABLE 16

| rust preventing oil composition | | Y1 | Y2 | Y3 | Y4 | Y5 | Y6 |
|---|---|---|---|---|---|---|---|
| composition in mass % | | | | | | | |
| metal salt of a carboxylic acid | A | 10 | 20 | 36 | 28 | — | 50 |
| | B | — | 10 | 44 | — | 10 | — |
| | C | 30 | — | — | — | — | — |
| wax | A | 10 | 20 | — | 12 | — | — |
| | B | 10 | 20 | 8 | 6 | 50 | — |
| | C | 10 | 10 | 4 | — | — | — |
| mineral oil | A | 26 | 20 | — | 12 | 22 | — |
| | B | — | — | — | 6 | — | — |
| sulfonate | A | 4 | — | 4 | 3 | 4 | 20 |
| | B | — | — | 4 | 5 | 4 | — |
| lubricant | A | — | — | — | 28 | — | — |
| | B | — | — | — | — | — | 25 |
| | C | — | — | — | — | 10 | 5 |
| saponification number mgKOH/g | | 110 | 87 | 150 | 74 | 20 | 113 |
| total base number mgKOH/g | | 29 | 16 | 46 | 20 | 37 | 85 |
| content of alkali metal in mass % | | 3.5 | 9 | 19 | 5.5 | 4 | 12 |

TABLE 17

| rust preventing oil | X1 | X2 | X3 | X4 | X5 | X6 | |
|---|---|---|---|---|---|---|---|
| composition | | | | | | | |
| rust preventing oil composition | Y1 | Y2 | Y3 | Y4 | Y5 | Y6 | |
| mass % | 50 | 50 | 25 | 65 | 50 | 40 | |
| solvent | A | B | B | A | A | A | B |
| mass % | 50 | 50 | 75 | 35 | 50 | 20 | 40 |
| viscosity cSt/40° C. | 15 | 10 | 5 | 17 | 25 | 25 | |

(notes)
solvent A: benzene, solvent B: gasoline

TABLE 18

| Test No. | Pin Pretreatment | Pin Lubricating film | Pin Rust preventing film | Box Pretreatment | Box Lubricating film | Box Rust preventing film |
|---|---|---|---|---|---|---|
| 1 | AsM (R = 3) | None | Rp:Y1 t = 10 | SB (R = 15) | epoxy resin (M = 1) MoS$_2$ (M = 3) t = 40 | Rp:Y1 t = 10 |
| 2 | SB (R = 5) P—Mn (t = 10) | None | Rp:Y2 t = 15 | SB (R = 5) P—Mn (t = 10) | polyamide-imide resin (M = 1) MoS$_2$ (M = 2.5) t = 25 | Rp:Y2 t = 15 |
| 3 | AsM (R = 3) P—Zn (t = 10) | None | Rp:Y3 t = 40 | SHB (R = 15) | Si—O (M = 1) MoS$_2$ (M = 3) t = 20 | Rp:Y3 t = 40 |
| 4 | SB (R = 5) | Ti—O (M = 1) MoS$_2$ (M = 3.5) t = 10 | Rp:Y4 t = 15 | SB (R = 5) P—Mn (t = 8) | Ti—O (M = 1) MoS$_2$ (M = 3.5) t = 10 | Rp:Y4 t = 15 |
| 5 | AsM (R = 3) | Ti—O (M = 1) MoS$_2$ (M = 3) graphite (M = 1.5) t = 15 | Rp:Y5 t = 15 | SB (R = 10) P—Mn (t = 15) | None | Rp:Y5 t = 15 |
| 6 | SB (R = 10) P—Mn (t = 8) | epoxy resin (M = 1) MoS$_2$ (M = 3) t = 10 | Rp:Y6 t = 2 | SB(R = 10) P—Mn (t = 8) | epoxy resin (M = 1) MoS$_2$ (M = 3) t = 10 | Rp:Y6 t = 2 |
| 7 | SB (R = 5) P—Mn (t = 10) | None | Rp:Y2 t = 15 | SB (R = 5) P—Mn (t = 10) | polyamide-imide resin (M = 1) MoS$_2$ (M = 2.5) t = 25 | None |
| 8 | SB (R = 10) P—Mn (t = 8) | epoxy resin (M = 1) MoS$_2$ (M = 3) t = 10 | None | SB (R = 10) P—Mn (t = 8) | epoxy resin (M = 1) MoS$_2$ (M = 3) t = 10 | Rp:Y6 t = 2 |
| 9 | SB (R = 10) P—Mn (t = 8) | epoxy resin (M = 1) MoS$_2$ (M = 3) t = 10 | None | SB (R = 10) P—Mn (t = 8) | epoxy resin (M = 1) MoS$_2$ (M = 3) t = 10 | None |
| 10 | AsM (R = 3) | compound grease: (20 g/dm$^2$) | | SB (R = 10) P—Mn (t = 15) | compound grease: (20 g/dm$^2$) | |

(Notes)
AsM: grinding, SB: sand blasting, SHB: shot blasting
P—Mn: manganese phosphate, P—Zn: zinc phosphate
Ti—O: inorganic polymeric compound with Ti—O backbone
Si—O: inorganic polymeric compound with Si—O backbone
R: surface roughness Rmax ($\mu$m), t: film thickness ($\mu$m)
M: relative content when content of inorganic polymeric compound with Mi—O backbone or resin is 1
Rp: rust preventing oil composition Next, using threaded joints on which the above-described surface treatment was performed, a salt spray test prescribed by JIS-Z2371 was performed in a state in which the pin and box were not joined to each other, and after 336 hours, the state of formation of rust was investigated.

Then, using a threaded joint on which the salt spray test had been performed, repeated tightening and loosening operations were carried out a maximum of 20 times under the conditions shown in Table 19, and the occurrence of galling and the variation in tightening torque under repeated tightening were investigated.

TABLE 19

| 1st–10th time | tightening and loosening at room temperature |
|---|---|
| 11th time | heating for 24 hr at 350° C. after tightening at room temperature, followed by cooling to room temperature then loosening |
| 12th–15th time | tightening and loosening at room temperature |
| 16th time | heating for 24 hr at 350° C. after tightening at room temperature, followed by cooling to room temperature then loosening |
| 17th–20th time | tightening and loosening at room temperature |

Namely, as shown in Table 19, tightening and loosening were carried out at room temperature 1st–10th times, 12th–15th times, and 17th–20th times. In addition, after the 11th and 16th tightening at room temperature, heat treatment at 350° C. for 24 hours was carried out, cooling was then performed, and loosening was performed at room temperature. The standard conditions for the tightening speed and the tightening torque were the same as in Table 5 of Example 1.

Table 20 shows the test results. The surface roughness is indicated by Rmax.

TABLE 20

| Test No. | Occurrence of rust *1 | Occurrence of galling *2 (Value: number of tightenings) | | | | | | | | | | | | | Torque variation |
|---|---|---|---|---|---|---|---|---|---|---|---|---|---|---|---|
| | | 7 | 8 | 9 | 10 | 11 | 12 | 13 | 14 | 15 | 16 | 17 | 18 | 19 | 20 | |
| 1 | ○ | ○ | ○ | ○ | ○ | ○ | ○ | ○ | ○ | ○ | ○ | ○ | ○ | ○ | ○ | Good ± 13% |
| 2 | ○ | ○ | ○ | ○ | ○ | ○ | ○ | ○ | ○ | ○ | ○ | ○ | ○ | ○ | ○ | Good ± 10% |
| 3 | ○ | ○ | ○ | ○ | ○ | ○ | ○ | ○ | ○ | ○ | ○ | ○ | ○ | ○ | Δ | Good ± 10% |
| 4 | ○ | ○ | ○ | ○ | ○ | ○ | ○ | ○ | ○ | ○ | ○ | ○ | ○ | ○ | ○ | Good <± 10% |
| 5 | ○ | ○ | ○ | ○ | ○ | ○ | ○ | ○ | ○ | ○ | ○ | ○ | ○ | ○ | ○ | Good <± 10% |
| 6 | ○ | ○ | ○ | ○ | ○ | ○ | ○ | ○ | ○ | ○ | ○ | ○ | ○ | ○ | Δ | Good ± 10% |
| 7 | ○ | ○ | ○ | ○ | ○ | ○ | ○ | ○ | ○ | ○ | ○ | ○ | ○ | ○ | ○ | Good ± 13% |
| 8 | ○ | ○ | ○ | ○ | ○ | ○ | ○ | ○ | ○ | ○ | ○ | ○ | ○ | ○ | ○ | Good ± 15% |
| 9 | X | ○ | ○ | ○ | ○ | ○ | ○ | Δ | Δ | X | — | — | — | — | — | Unstable ± 50% |
| 10 | ○ | ○ | ○ | Δ | Δ | X | — | — | — | — | — | — | — | — | — | Good <± 10% |

(Notes)
*1 ○: no occurrence of rusting, Δ: occurrence (moderate), not good,
X: much occurrence, bad
*2 ○: no occurrence of galling, Δ: light occurrence (surface adjustment possible),
X: much occurrence (surface adjustment not possible), —: not carried out (1) Test Number 1

The following surface treatment was performed on a threaded joint made of the carbon steel shown in Table 7. The pin surface was finished by machine grinding to give it a surface roughness of 3 μm. The pin surface was coated with the type X1 rust preventing oil shown in Table 17 to form a rust preventing film having a thickness of 10 μm. Number 80 sand was blown at the box surface to give it a surface roughness of 15 μm. An epoxy resin with an average molecular weight of 15,000 was mixed with molybdenum disulfide powder having an average particle diameter of 1.5 μm in a mass proportion of 3 parts of molybdenum disulfide per 1 part of the resin and was applied to the box surface using a liquid mixture of toluene and isopropyl alcohol as a dispersant to form a lubricating film. The thickness of the lubricating film measured in a dry state was 40 μm. Then, the type X1 rust preventing oil shown in Table 17 was applied atop the lubricating film to form a rust preventing film having a thickness of 10 μm.

As shown in Table 20, in the salt spray test, the occurrence of rust was not observed on either the pin or the box. In the tightening and loosening test, there was no occurrence of galling through the 20 times of tightening and loosening of Table 19, and the results were extremely good. In addition, through the 20 times of tightening and loosening, the tightening torque was stable with a variation of about ±13 percent which was good.

(2) Test Number 2

The following surface treatment was performed on a threaded joint made of the carbon steel shown in Table 7. Number 120 sand was blown at both the pin surface and the box surface to give both a surface roughness of 5 μm. Then, a manganese phosphate film having a thickness of 10 μm was formed on the surface of both by chemical conversion treatment. A polyamide-imide resin having an average molecular weight of 15,000 was mixed with molybdenum disulfide powder having an average particle diameter of 1.0 μm in a mass proportion of 2.5 parts of molybdenum disulfide per 1 part of the polyamide-imide resin and was applied atop the manganese phosphate film on the box using a liquid mixture of toluene and methyl ethyl ketone as a dispersant to form a lubricating film. After drying, heating was carried out at 180° C. for 20 minutes, after which the lubricating film thickness was measured and found to be 25 μm. Then, type X2 rust preventing oil shown in Table 17 was applied atop the manganese phosphate film on the pin and atop the lubricating film on the box to form a rust preventing film having a thickness of 15 μm.

As shown in Table 20, in the salt spray test, the occurrence of rust was not observed on either the pin or the box. In the tightening and loosening test, there was no occurrence of galling through the 20 times of tightening and loosening of Table 19, and the results were extremely good. In addition, through the 20 times of tightening and loosening, the tightening torque was stable with a variation of about ±10 percent and was good.

(3) Test Number 3

The following surface treatment was performed on a threaded joint made of the Cr—Mo steel shown in Table 7. The pin surface was finished by machine grinding to give it a surface roughness of 3 μm, and a zinc phosphate film having a thickness of 10 μm was formed on the pin surface by chemical conversion treatment. Number 80 shot was blown at the box surface to give it a surface roughness of 15 μm. A silicon alkoxide in which the alkyl group was ethyl was mixed with molybdenum disulfide powder having an average particle diameter of 1.8 μm in a mass proportion of 2.3 parts of molybdenum disulfide per 1 part of silicon alkoxide, and this was applied to the box surface using a liquid mixture of xylene, methylene chloride, and butyl alcohol as a dispersant to form a lubricating film. Then, it was left in the atmosphere for 3 hours, hot air at 165° C. was blown for 30 minutes. When the composition of the lubricating film formed on the box surface was measured in a dry state, the content in mass proportion was 3 parts of molybdenum disulfide per 1 part of an inorganic polymeric compound having an Si—O backbone. The film thickness was 20 μm. Next, the type X3 rust preventing oil shown in Table 17 was coated on the zinc phosphate film on the pin and on the lubricating film on the box to form a rust preventing film having a thickness of 40 μm.

As shown in Table 20, in the salt spray test, the occurrence of rust was not observed on the pin or the box. In the tightening and loosening test, there was no occurrence of galling through the completion of the 19 times of tightening and loosening of Table 19, and the results were good. Light galling occurred on the 20th tightening, but surface adjustment was possible. Through the 20 times of tightening and loosening, the tightening torque was stable with a variation of about ±10 percent was good.

(4) Test Number 4

The following surface treatment was performed on a threaded joint made of the carbon steel shown in Table 7.

Number 120 sand was blown at the pin surface and the box surface to give them a surface roughness of 5 μm, after which a manganese phosphate film having a thickness of 8 μm was formed on the box surface by chemical conversion treatment. A titanium alkoxide in which the alkyl group was ethyl was mixed with molybdenum disulfide powder having an average particle diameter of 1.0 μm in a mass proportion of 2.3 parts of molybdenum disulfide per 1 part of titanium alkoxide, and this was applied atop the pin surface and atop the manganese phosphate film using a liquid mixture of xylene, methylene chloride, and butyl alcohol-as a dispersant to form a lubricating film. Then, after it was left for 4 hours in the atmosphere, hot air at 150° C. was blown for 20 minutes. When the composition of the lubricating film was measured after drying, the content was 3.5 parts of molybdenum disulfide per 1 part of an inorganic polymeric compound having a Ti—O backbone. The film thickness was 10 μm. Then, type X4 rust preventing oil shown in Table 17 was applied atop the lubricating film on both the pin and the box to form a rust preventing film having a thickness of 15 μm.

As shown in Table 20, in the salt spray test, the occurrence of rust was not observed on either the pin or the box. In the tightening and loosening test, there was no occurrence of galling through the 20 times of tightening and loosening of Table 19, and the results were extremely good. Through the 20 times of tightening and loosening, the tightening torque was stable with a variation of less than ±10 percent and was good.

(5) Test Number 5

The following surface treatment was performed on a threaded joint made of the Cr—Mo steel shown in Table 7. The pin surface was finished by machine grinding to a surface roughness of 3 μm. Atop this was applied a mixture of a titanium alkoxide in which the alkyl group was isopropyl, molybdenum disulfide powder having an average particle diameter of 2.6 μm, and graphite powder having an average particle diameter of 1.3 μm in a mass proportion of 1.8 parts of molybdenum disulfide and 0.9 parts of graphite per 1 part of titanium alkoxide using a liquid mixture of methyl ethyl ketone, methylene chloride, and butyl alcohol as a dispersant to form a lubricating film. Then, after it was left in the atmosphere for 3 hours, humidified hot air at 150° C. was blown for 10 minutes. When the composition of the lubricating film was measured in a dry state, the content in mass proportion was 3 parts of molybdenum disulfide and 1.5 parts of graphite per 1 part of an inorganic polymeric compound having a Ti—O backbone. The film thickness was 15 μm. Number 80 sand was blown at the box surface to give it a surface roughness of 10 μm, and a manganese phosphate film having a thickness of 15 μm was formed on its surface by chemical conversion treatment. Then, type X5 rust preventing oil shown in Table 17 was applied atop the lubricating film on the pin and atop the manganese phosphate film on the box to form a rust preventing film having a thickness of 15 μm.

As shown in Table 20, in the salt spray test, the occurrence of rust was not observed on either the pin or the box. In the tightening and loosening test, there was no occurrence of galling through the 20 times of tightening and loosening of Table 19, and the results were extremely good. In addition, through the 20 times of tightening and loosening, the tightening torque was stable with a variation of less than ±10 percent and was good.

(6) Test Number 6

The following surface treatment was performed on a threaded joint made of the carbon steel shown in Table 7. Number 80 sand was blown at the pin surface and the box surface to give then a surface roughness of 10 μm, after which a manganese phosphate film having a thickness of 8 μm was formed on both by chemical conversion treatment. An epoxy resin with an average molecular weight of 10,000 was mixed with molybdenum disulfide powder having an average particle diameter of 1.8 μm in a mass proportion of 1.5 parts of molybdenum disulfide per 1 part of the epoxy resin, and this was applied atop the manganese phosphate films using a liquid mixture of toluene and xylene as a dispersant. Then, after drying, heat treatment was performed at 180° C. for 20 minutes. When the composition of the lubricating film formed on the pin surface and the box surface was measured after heat treatment, the content in mass proportion for both the pin and the box was 3 parts of molybdenum disulfide per 1 part of epoxy resin. The film thickness was 10 μm. Then, type X6 rust preventing oil shown in Table 17 was applied atop the lubricating film formed on the pin surface and the box surface to form a rust preventing film having a thickness of 2 μm.

As shown in Table 20, in the salt spray test, the occurrence of rust was not observed on either the pin or the box. In the tightening and loosening test, there was no occurrence of galling through the completion of the 19 times of tightening and loosening of Table 19, and the results were good. Light galling occurred on the 20th tightening, but surface adjustment was possible. In addition, through the 20 times of tightening and loosening, the tightening torque was stable with a variation of about ±10 percent and was good.

(7) Test Number 7

Surface treatment was performed under the same conditions as for Test Number 2 except that a rust preventing film was not formed on the box.

As shown in Table 20, in the salt spray test, the occurrence of rusting was not observed on either the pin or the box. In the tightening and loosening test, there was no occurrence of galling through the 20 times of tightening and loosening of Table 19, and the results were extremely good. In addition, through the 20 times of tightening and loosening, the tightening torque was stable with a variation of about ±13 percent and was good.

(8) Test Number 8

Surface treatment was performed under the same conditions as in Test Number 6 except that a rust preventing film was not formed on the pin.

As shown in Table 20, in the salt spray test, the occurrence of rusting was not observed on either the pin or the box. In the tightening and loosening test, there was no occurrence of galling through the 20 times of tightening and loosening of Table 19, and the results were good. In addition, through the 20 times of tightening and loosening, the tightening torque was stable with a variation of about ±15 percent and was good.

(9) Test Number 9

Surface treatment under the same conditions as for the above-described Test Number 6 was performed on a threaded joint made of the carbon steel shown in Table 7 except that a rust preventing film was not performed. Namely, a manganese phosphate film having a thickness of 8 μm was formed on the pin surface and the box surface, and a lubricating film having a thickness of 15 μm and made from an epoxy resin and molybdenum disulfide was formed atop the manganese phosphate film.

As shown in Table 20, rust appeared over nearly the entire surface of the lubricating film on both the pin and the box, and peeling of a portion of the lubricating film was observed. In the tightening and loosening test, light galling was observed on the 13th tightening, galling took place completely on the 15th time, and the test was stopped. In addition, through the 14 times of tightening and loosening, the tightening torque had a large variation of approximately ±50 percent and was unstable.

(10) Test Number 10

The following surface treatment was performed on a threaded joint made of the carbon steel shown in Table 7. The pin surface was finished by machine grinding to give it a surface roughness of 3 µm. A manganese phosphate film having a thickness of 15 µm was formed by chemical conversion treatment on the box surface at which Number 80 sand had been blown to give it a surface roughness of 10 µm. Then, a compound grease corresponding to API-Bu15A2 was applied to the pin surface and to the top surface of the manganese phosphate film in an amount of approximately 20 grams per unit area (1 dm$^2$).

As shown in Table 20, in the salt spray test, there was no occurrence of rust on either the pin or the box. In the tightening and loosening test, light galling occurred from the 8th tightening, but surface adjustment was performed and the test was continued. However, galling occurred upon the 11th loosening, and continuation of the test was impossible. Through the 10 times of tightening and loosening, the tightening torque was stable with a variation of less than ±10 percent.

In the above manner, it was found that the threaded joints of Test Numbers 1–8 had rust preventing properties as excellent as those of a threaded joint coated with a compound grease, and that compared to the threaded joints of Test Numbers 9 and 10, the galling resistance was excellent, and there was also the effect that variations in tightening torque could be suppressed.

Possibility of Industrial Use

The threaded joints of the first invention through the sixth invention suppress the occurrence of galling at the time of repeated tightening and loosening and provide a high degree of air tightness without using a liquid lubricant such as a compound grease.

In particular, the threaded joints of the first through sixth inventions on which a lubricating film of an inorganic polymeric compound is formed have a low coefficient of friction at the time of loosening and a high degree of air tightness is obtained with a low tightening torque, and even in crude oil excavation under high temperature conditions such as in deep, high temperature wells or steam injection wells, the occurrence of galling at the time of repeated tightening and loosening is suppressed, and a high degree of air tightness is obtained.

In particular, the threaded joints of the fifth invention and the sixth invention suppress the occurrence of rust and do away with instability of tightening torque.

What is claimed is:

1. A threaded joint for an oil well pipe comprising a pin and a box each having a threaded portion and an unthreaded metal contact portion, characterized by having a lubricating film formed on the unthreaded metal contact portion of at least one of either the pin or the box, the lubricating film comprising a solid lubricant dispersed and mixed in an inorganic polymeric compound, the inorganic polymeric compound having an M—O backbone.

2. A threaded joint for an oil well pipe comprising a pin and a box each having a threaded portion and an unthreaded metal contact portion, characterized by having a phosphate film formed on the unthreaded metal contact portion of at least one of either the pin or the box, and having a lubricating film formed atop the phosphate film, the lubricating film comprising a solid lubricant dispersed and mixed in an inorganic polymeric compound, the inorganic polymeric compound having an M—O backbone.

3. A threaded joint for an oil well pipe comprising a pin and a box each having a threaded portion and an unthreaded metal-contact portion, characterized by having a layer of Cu plating formed on the unthreaded metal contact portion of at least one of either the pin or the box, and having a lubricating film formed atop the layer of Cu plating, the lubricating film comprising a solid lubricant dispersed and mixed in a polymeric compound, the polymeric compound comprising an inorganic polymeric compound or a resin, the inorganic polymeric compound having an M—O backbone.

4. A threaded joint for an oil well pipe comprising a pin and a box each having a threaded portion and an unthreaded metal contact portion, characterized by having a layer of Cu plating formed on the unthreaded metal contact portion of one of either the pin or the box, and having a lubricating film formed on the other unthreaded metal contact portion, the lubricating film comprising a solid lubricant dispersed and mixed in a polymeric compound, the polymeric compound comprising an inorganic polymeric compound or a resin, the inorganic polymeric compound having an M—O backbone.

5. A threaded joint for an oil well pipe comprising a pin and a box each having a threaded portion and an unthreaded metal contact portion, characterized by having a lubricating film formed on one of either the pin or the box, and having a rust preventing film formed on the other or atop the lubricating film, the rust preventing film comprising a rust preventing oil composition containing an alkali metal salt of a carboxylic acid and/or an alkali earth metal salt of a carboxylic acid, the lubricating film comprising a solid lubricant dispersed and mixed in a polymeric compound, the polymeric compound comprising a resin or an inorganic polymeric compound, the inorganic polymeric compound having an M—O backbone.

6. A threaded joint for an oil well pipe as described in claim 5 characterized in that the thickness of the rust preventing film formed on the other is 5–50 µm.

7. A threaded joint for an oil well pipe as described in claim 5 characterized in that the thickness of the rust preventing film formed atop the lubricating film is 1–50 µm.

8. A threaded joint for an oil well pipe as described in claim 5 characterized in that the saponification number of the rust preventing oil composition is 20–150 mgKOH/g, its total base number is 15–100 mgKOH/g, and the total content of the alkali metals and alkali earth metals in the rust preventing oil composition is 2–20 mass %.

9. A threaded joint for an oil well pipe comprising a pin and a box each having a threaded portion and an unthreaded metal contact portion, characterized by having a lubricating film formed on both the box and the pin, and having a rust preventing film atop the lubricating film of at least one of either the box or the pin, the rust preventing film comprising a rust preventing oil composition containing an alkali metal salt of a carboxylic acid and/or an alkali earth metal salt of a carboxylic acid, the lubricating film comprising a solid lubricant dispersed and mixed in a polymeric compound, the polymeric compound comprising a resin or an inorganic polymeric compound, the inorganic polymeric compound having an M—O backbone.

10. A threaded joint for an oil well pipe as described in claim 9 characterized in that the thickness of the rust preventing film formed atop the lubricating film is 1–50 µm.

11. A threaded joint for an oil well pipe as described in claim 9 characterized in that the saponification number of the rust preventing oil composition is 20–150 mgKOH/g, its total base number is 15–100 mgKOH/g, and the total content of the alkali metals and alkali earth metals in the rust preventing oil composition is 2–20 mass %.

12. A threaded joint for an oil well pipe as described in claim 1 characterized in that the inorganic polymeric compound has a Ti—O backbone.

13. A threaded joint for an oil well pipe as described in claim 2 characterized in that the inorganic polymeric compound has a Ti—O backbone.

14. A threaded joint for an oil well pipe as described in claim 3 characterized in that the inorganic polymeric compound has a Ti—O backbone.

15. A threaded joint for an oil well pipe as described in claim 4 characterized in that the inorganic polymeric compound has a Ti—O backbone.

16. A threaded joint for an oil well pipe as described in claim 5 characterized in that the inorganic polymeric compound has a Ti—O backbone.

17. A threaded joint for an oil well pipe as described in claim 9 characterized in that the inorganic polymeric compound has a Ti—O backbone.

* * * * *